United States Patent
Asmus et al.

(10) Patent No.: US 11,867,419 B2
(45) Date of Patent: Jan. 9, 2024

(54) SYSTEMS AND METHODS TO AUTOMATICALLY LINK AVAILABILITY OF SERIES DEVICES IN A PLANT

(71) Applicant: Johnson Controls Technology Company, Auburn Hills, MI (US)

(72) Inventors: Matthew J. Asmus, Watertown, WI (US); Maxwell J. Neuman, Milwaukee, WI (US)

(73) Assignee: JOHNSON CONTROLS TECHNOLOGY COMPANY, Auburn Hills, MI (US)

(*) Notice: Subject to any disclaimer, the term of this patent is extended or adjusted under 35 U.S.C. 154(b) by 141 days.

(21) Appl. No.: 17/334,235

(22) Filed: May 28, 2021

(65) Prior Publication Data

US 2021/0285674 A1    Sep. 16, 2021

Related U.S. Application Data

(63) Continuation-in-part of application No. 16/046,955, filed on Jul. 26, 2018, now Pat. No. 11,092,352.
(Continued)

(51) Int. Cl.
*F24F 11/54*    (2018.01)
*F24F 11/56*    (2018.01)
(Continued)

(52) U.S. Cl.
CPC .............. *F24F 11/54* (2018.01); *F24F 11/52* (2018.01); *F24F 11/56* (2018.01); *F24F 11/74* (2018.01); *H04L 67/125* (2013.01)

(58) Field of Classification Search
CPC .. F24F 11/54; F24F 11/52; F24F 11/56; F24F 11/74; F24F 11/50; H04L 67/125
See application file for complete search history.

(56) References Cited

U.S. PATENT DOCUMENTS 5,469,366 A    11/1995    Yang et al.
6,241,156 B1    6/2001    Kline et al.
(Continued)

FOREIGN PATENT DOCUMENTS

EP              1 156 286 A2    11/2001
WO      WO-2012/161804 A1    11/2012
WO      WO-2013/130956 A1      9/2013

OTHER PUBLICATIONS

EP Office Action on EP Appl. Ser. No. 18186143.6 dated Feb. 2, 2022 (8 pages).
(Continued)

*Primary Examiner* — Charles Cai
(74) *Attorney, Agent, or Firm* — Foley & Lardner LLP

(57) ABSTRACT

A controller for a plurality of interconnected devices in a system is shown. The controller includes a processing circuit configured to detect that a first device of the plurality of interconnected devices is unavailable and identify a second device of the plurality of interconnected devices schematically dependent upon the first device by conducting a graph theory analysis on schematic relationships indicating connections among the plurality of interconnected devices. The processing circuit is further configured to, in response to identifying the second device schematically dependent upon the first device, generate a reduced subset of the plurality of interconnected devices that excludes the second device. The processing circuit is further configured to operate the reduced subset to transfer one or more resources among the reduced subset via the connections.

18 Claims, 21 Drawing Sheets

Related U.S. Application Data

(60) Provisional application No. 62/537,739, filed on Jul. 27, 2017.

(51) Int. Cl.
*H04L 67/125* (2022.01)
*F24F 11/74* (2018.01)
*F24F 11/52* (2018.01)

(56) References Cited

U.S. PATENT DOCUMENTS

| | | | |
|---|---|---|---|
| 7,216,017 | B2 | 5/2007 | Kwon et al. |
| 7,870,750 | B2 | 1/2011 | Yoon et al. |
| 8,875,080 | B1 * | 10/2014 | Parks ................ G06F 30/30 716/139 |
| 8,903,554 | B2 | 12/2014 | Stagner |
| 9,798,840 | B1 * | 10/2017 | Ginetti ............... G06F 30/20 |
| 10,558,178 | B2 | 2/2020 | Willmott et al. |
| 2003/0055798 | A1 | 3/2003 | Hittle et al. |
| 2006/0036422 | A1 * | 2/2006 | Gryba ................ G06F 30/33 703/14 |
| 2008/0178615 | A1 | 7/2008 | Yoon et al. |
| 2008/0179409 | A1 | 7/2008 | Seem |
| 2009/0241081 | A1 * | 9/2009 | Smith .............. G06F 30/3312 716/113 |
| 2013/0123992 | A1 | 5/2013 | Ishizaka |
| 2013/0168038 | A1 | 7/2013 | Ishizaka |
| 2014/0081467 | A1 | 3/2014 | Sato |
| 2015/0311919 | A1 * | 10/2015 | Karimi .............. H03M 13/1128 714/776 |
| 2015/0316902 | A1 | 11/2015 | Wenzel et al. |
| 2015/0316946 | A1 * | 11/2015 | Wenzel ............... G06Q 10/04 700/291 |
| 2015/0333669 | A1 * | 11/2015 | Alexander ............ H02P 6/24 318/599 |
| 2015/0369847 | A1 | 12/2015 | Roosli |
| 2016/0084515 | A1 | 3/2016 | Sato et al. |
| 2016/0109146 | A1 | 4/2016 | Zhang et al. |
| 2016/0156299 | A1 * | 6/2016 | Romanowich ........ H02P 29/40 318/400.21 |
| 2016/0187019 | A1 | 6/2016 | Miura et al. |
| 2016/0313752 | A1 | 10/2016 | Przybylski |
| 2017/0153052 | A1 | 6/2017 | Goel et al. |

OTHER PUBLICATIONS

Astrom. "Optimal Control of Markov Decision Processes with Incomplete State Estimation," J. Math. Anal. Appl., 1965, 10, pp. 174-205.
Bittanti et al., Adaptive Control of Linear Time Invariant Systems: The "Bet on the Best" Principle, Communications in Information and Systems, 2006, 6.4, pp. 299-320.
Chen et al., "Control-oriented System Identification: an H1 Approach," Wiley-Interscience, 2000, 19, Chapters 3 & 8, 38 pages.
Extended European Search Report on EP 18186143.6, dated Dec. 20, 2018, 8 pages.
Feng et al., "Model Predictive Control of Radiant Slab Systems with Evaporative Cooling Sources," Energy and Buildings, 2015, 87, pp. 199-210.
Hardt et al., "Gradient Descent Learns Linear Dynamical Systems," Journal of Machine Learning Research, 2018, 19, pp. 1-44.
Helmicki et al. "Control Oriented System Identification: a Worst-case/deterministic Approach in H1," IEEE Transactions on Automatic Control, 1991, 36.10, pp. 1163-1176.
Kelman et al., "Bilinear Model Predictive Control of a HVAC System Using Sequential Quadratic Programming," Proceedings of the IFAC World Congress, Sep. 2, 2011, 6 pages.
Kingma et al,. "Adam: A Method for Stochastic Optimization," International Conference on Learning Representations (ICLR), 2015, 15 pages.

Ljung et al., "Theory and Practice of Recursive Identification," vol. 5. JSTOR, 1983, Chapters 2, 3 & 7, 80 pages.
Ljung, editor. "System Identification: Theory for the User," 2nd Edition, Prentice Hall, Upper Saddle River, New Jersey, 1999, Chapters 5 and 7, 40 pages.
Nevena et al., "Data center cooling using model-predictive control," 32nd Conference on Neural Information Processing Systems, 2018, 10 pages.
Strang, Gilbert, "Computational Science and Engineering," Wellesley-Cambridge Press, Wellesley MA, 2007, 7 pages.
Yudong et al., "Predictive Control for Energy Efficient Buildings with Thermal Storage: Modeling, Stimulation, and Experiments." IEEE Control Systems, Feb. 2012, 32.1, pp. 44-64.
Afram et al., "Theory and Application of HVAC Control Systems—A review of Model Predictive Control (MPC)," Building and Environment, Feb. 2014, vol. 72 (pp. 343-355).
Ahn et al., "Optimal Control Development for Chilled Water Plants Using a Quadratic Representation," Energy and Buildings, Apr. 2001, vol. 33, No. 4 (pp. 371-378).
Burer et al., "Non-convex Mixed-Integer Nonlinear Programming: A Survey," Surveys in Operations Research and Management Science, Jul. 2012, vol. 17, No. 2 (pp. 97-106).
Cantoni, A., "Optimal Curve Fitting with Piecewise Linear Functions," IEEE Transactions on Computers, Jan. 1971, vol. 20, No. (pp. 59-67).
Corbin et al., "A Model Predictive Control Optimization Environment for Real-Time Commercial Building Application," Journal of Building Performance Simulation, 2013, (Published online: Jan. 11, 2012) vol. 6, No. 3 (pp. 159-174).
Drgona et al., "All you Need to Know about Model Predictive Control for Buildings," Annual Reviews in Control, 2020, vol. 50 (pp. 190-232).
EPO Notice of Opposition to a European Patent issued in Appl. Ser. No. EP 16165681.4 dated May 2, 2023 (48 pages).
EPO Notice of Opposition to a European Patent issued in Appl. Ser. No. EP 16165681.4 dated May 2, 2023 (51 pages).
EPO Notice of Opposition to a European Patent with Consolidated List issued in EP Appl. Ser. No. 16165681.4 dated May 2, 2023 (4 pages).
EPO Office Action on EP Appl. Ser. No. 16165681.4 dated Apr. 6, 2021 (7 pages).
Extended European Search Report on EP Appl. Ser. No. 16165681.4 dated Oct. 20, 2016 (5 pages).
Extended European Search Report on EP Appl. Ser. No. 22177772.5 dated Sep. 26, 2022 (11 pages).
Hackner, J.R., "HVAC system dynamics and energy use in existing buildings," Doctoral Dissertation, University of Madison, Wisconsin, 1984 (174 pages).
Haves et al., "Model Predictive Control of HVAC Systems: Implementation and Testing at the University of California, Merced," Technical Report, U.S. Department of Energy Office of Scientific and Technical Information, Jun. 29, 2010 (140 pages).
Huang et al., "A New Model Predictive Control Scheme for Energy and Cost Savings in Commercial Buildings: An Airport Terminal Building Case Study," Building and Environment, Jul. 2015, vol. 89 (pp. 203-216).
Kelman et al., "Analysis of Local Optima in Predictive Control for Energy Efficient Buildings," Journal of Building Performance Simulation, Apr. 16, 2012, vol. 6, No. 3 (pp. 236-255).
Koehler et al., "Building Temperature Distributed Control via Explicit MPC and 'Trim and Respond Methods," European Control Conference (ECC), Jul. 17-19, 2013, Zurich, Switzerland (pp. 4334-4339).
Kwadzogah et al., "Model Predictive Control for HVAC Systems—A Review," 2013 IEEE International Conference on Automation Science and Engineering, Model Predictive Control for HVAC Systems—A Review, 2013 IEEE International Conference on Automation Science and Engineering (CASE), Madison, WI, United States, Aug. 17-20, 2013 (pp. 442-447).
McKenna et al., "A TRNSYS model of a building HVAC system with GSHP and PCM thermal energy storage—component modelling and validation," Proceedings of BS2013: 13th Conference of

(56) References Cited

OTHER PUBLICATIONS

International Building Performance Simulation Association, Chambéry, France, Aug. 26-28, 2013 (pp. 3336-3343).

Mossolly et al., "Optimal Control Strategy for a Multizone Air Conditioning System Using a Genetic Algorithm," Energy, Jan. 2009, vol. 34, No. 1 (pp. 58-66).

Nassif et al., "Optimization of HVAC Control System Strategy Using Two-Objective genetic Algorithm," International Journal of HVA C&R Research, vol. 11, No. 3 (pp. 459-486).

Sourbon et al., "Dynamic Thermal Behaviour of Buildings with Concrete Core Activation," Dissertation, Arenberg Doctoral School of Science, Engineering & Technology, Katholieke Universiteit Leuven—Faculty of Engineering Celestijnenlaan: 300A box 2421, B-3001 Heverlee (Belgium) Sep. 2012 (416 pages).

Stluka et al., "Energy Management for Buildings and Microgrids," 2011 50th IEEE Conference on Decision and Control and European Control Conference (CDCECC) Orlando, FL, USA, Dec. 12-15, 2011 (pp. 5150-5157).

Strurznegger, D., "Model Predictive Building Climate Control, Steps Towards Practice," Doctoral Thesis, Automatic Control Laboratory, Zurich, Switzerland, 2014 (176 pages).

Sun et al., Optimal Control of Building HVAC&R Systems Using Complete Simulation-Based Sequential Quadratic Programming (CSB-SQP), Building and Environment, May 2005, vol. 40, No. 5 (pp. 657-669).

Third Party Observation Report on EP Appl. Ser. No. 16165681.4 dated Jan. 15, 2020 (8 pages).

Third Party Observation Report on EP Appl. Ser. No. 16165681.4 dated Oct. 5, 2018 (6 pages).

Verhelst et al., "Study of the Optimal Control Problem Formulation for Modulating Air-to-Water Heat Pumps Connected to a Residential Floor Heating System," Energy and Buildings, Feb. 2012, vol. 45 (pp. 43-53).

Verhelst, C., "Model Predictive Control of Ground Coupled Heat Pump Systems in Office Buildings," Dissertation, Arenberg Doctoral School of Science, Engineering & Technology, Katholieke Universiteit Leuven—Faculty of Engineering Celestijnenlaan : 300A box 2421, B-3001 Heverlee (Belgium) Apr. 20, 2012 (316 pages).

Wang et al., "Model-Based Optimal Control of VAV Air-Conditioning System Using Genetic Algorithm," Building and Environment, Aug. 2000, vol. 35, No. 6 (pp. 471-487).

Wang et al., "Supervisory and Optimal Control of Building HVAC Systems: A Review," HVAC&R Research, Jan. 2008, vol. 14, No. 1 (pp. 3-32).

Xi et al., "Support Vector Regression Model Predictive Control on a HVAC Plant," Control Engineering Practice, Aug. 2007, vol. 15, No. 8 (pp. 897-908).

Yao et al., "Global Optimization of a Central Air-Conditioning System Using Decomposition-Coordination Method," Energy and Buildings, May 2010, vol. 42, No. 5 (pp. 570-583).

* cited by examiner

800A

| Devices | | | Nodes | | | | |
|---|---|---|---|---|---|---|---|
| Dev Type | Dev Name | Dev # | 1 | 2 | 3 | 4 | 5 |
| Chiller | C1 | 1 | 0 | -1 | 0 | 1 | 0 |
| HRC | C2 | 2 | 0 | 0 | -1 | 1 | 0 |
| Tank | T1 | 3 | -1 | 0 | 0 | 1 | 0 |
| Tank | T2 | 4 | 1 | 0 | 0 | -1 | 0 |
| Load | Load | 5 | 1 | 0 | 0 | 0 | -1 |
| Pump | P1 | 6 | -1 | 1 | 0 | 0 | 0 |
| Pump | P2 | 7 | -1 | 0 | 1 | 0 | 0 |
| Pump | P3 | 8 | 0 | 0 | 0 | -1 | 1 |

| Devices | | | Nodes | | | | |
|---|---|---|---|---|---|---|---|
| Dev Type | Dev Name | Dev # | 1 | 2 | 3 | 4 | 5 |
| Chiller | C1 | 1 | 0 | 0 | 0 | 0 | 0 |
| HRC | C2 | 2 | 0 | 0 | -1 | 1 | 0 |
| Tank | T1 | 3 | -1 | 0 | 0 | 1 | 0 |
| Tank | T2 | 4 | 1 | 0 | 0 | -1 | 0 |
| Load | Load | 5 | 1 | 0 | 0 | 0 | -1 |
| Pump | P1 | 6 | -1 | 1 | 0 | 0 | 0 |
| Pump | P2 | 7 | -1 | 0 | 1 | 0 | 0 |
| Pump | P3 | 8 | 0 | 0 | 0 | -1 | 1 |

830 → Pump P1

| Devices | | | Nodes | | | | |
|---|---|---|---|---|---|---|---|
| Dev Type | Dev Name | Dev # | 1 | 2 | 3 | 4 | 5 |
| Chiller | C1 | 1 | 0 | 0 | 0 | 0 | 0 |
| HRC | C2 | 2 | 0 | 0 | -1 | 1 | 0 |
| Tank | T1 | 3 | -1 | 0 | 0 | 1 | 0 |
| Tank | T2 | 4 | 1 | 0 | 0 | -1 | 0 |
| Load | Load | 5 | 1 | 0 | 0 | 0 | -1 |
| Pump | P1 | 6 | 0 | 0 | 0 | 0 | 0 |
| Pump | P2 | 7 | -1 | 0 | 1 | 0 | 0 |
| Pump | P3 | 8 | 0 | 0 | 0 | -1 | 1 |

FIG. 8C  840  845

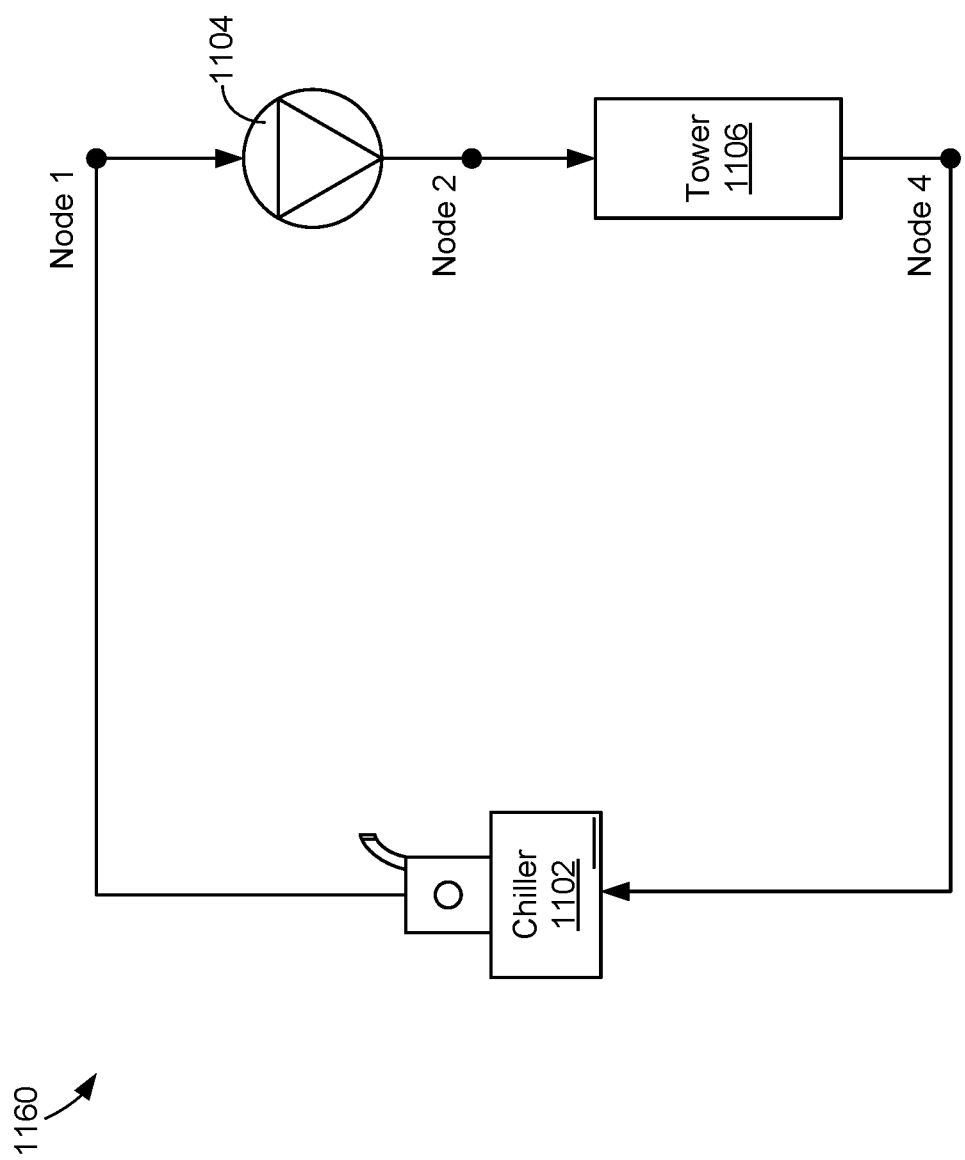

SYSTEMS AND METHODS TO AUTOMATICALLY LINK AVAILABILITY OF SERIES DEVICES IN A PLANT

CROSS-REFERENCE TO RELATED PATENT APPLICATIONS

This application is a continuation-in-part of U.S. Non-Provisional application Ser. No. 16/046,955 filed Jul. 26, 2018, which claims the benefit of priority to U.S. Provisional Patent Application No. 62/537,739, filed Jul. 27, 2017, both of which are incorporated by reference herein in their entireties.

BACKGROUND

The present disclosure relates generally to building management systems. More specifically, the present disclosure relates to building management systems configured to improve building system models by removing unnecessary parts of the model.

SUMMARY

One implementation of the present disclosure is a controller for a plurality of interconnected devices in a system. The controller includes a processing circuit configured to detect that a first device of the plurality of interconnected devices is unavailable and identify a second device of the plurality of interconnected devices schematically dependent upon the first device by conducting a graph theory analysis on schematic relationships indicating connections among the plurality of interconnected devices. The processing circuit is further configured to, in response to identifying the second device schematically dependent upon the first device, generate a reduced subset of the plurality of interconnected devices that excludes the second device. The processing circuit is further configured to operate the reduced subset to transfer one or more resources among the reduced subset via the connections.

In some embodiments, conducting the graph theory analysis on the schematic relationships includes, in response to detecting that the first device is unavailable, updating a first matrix of available devices to indicate that the first device is unavailable, wherein the first matrix includes an availability of each device in the plurality of interconnected devices and using the first matrix to update a second matrix, wherein the second matrix identifies a connection to a node for the first device.

In some embodiments, conducting the graph theory analysis on the schematic relationships further includes using the second matrix to determine that the second device is connected to the node and is located downstream of the first device, determining that there are no devices located upstream of the node and connected to the node, and, in response to determining that there are no devices located upstream of the node and connected to the node, removing the second device from the plurality of interconnected devices to generate the reduced subset of the plurality of interconnected devices.

In some embodiments, removing the second device from the plurality of interconnected devices includes updating the first matrix to identify that the second device is unavailable, and updating the second matrix using the first matrix to remove the second device from the plurality of interconnected devices.

In some embodiments, the controller is further configured to, in response to removing the second device from the plurality of interconnected devices to generate the reduced subset, conduct the graph theory analysis repeatedly until there are no more devices of the plurality of interconnected devices that are schematically dependent on any device of the plurality of interconnected devices that is unavailable.

In some embodiments, conducting the graph theory analysis on the schematic relationships includes using a plurality of matrices to identify the second device of the plurality of interconnected devices schematically dependent upon the first device. In some embodiments, each set of elements of a matrix of the plurality of matrices in a first direction is associated with a corresponding device of the plurality of interconnected devices and each set of elements of the matrix of the plurality of matrices in a second direction is associated with a corresponding node.

In some embodiments, operating the reduced subset to transfer the one or more resources among the reduced subset via the connections incldues operating the reduced subset to transfer at least one of a first fluid, wherein the system is a chiller system, and the first device is at least one of a pump, valve, storage unit, or a chiller, a second fluid, wherein the system is an air flow system, and the first device is at least one of a variable air volume (VAV) box, a damper, an actuator, or a fan, and a flow of electricity, wherein the system is an electrical system, and the first device is at least one of a motor, a generator, or an electric HVAC device.

In some embodiments, the processing circuit is further configured to generate the schematic relationships indicating connections among the plurality of interconnected devices using a combination of devices from a plurality of different subsystems, the plurality of different subsystems including the chiller system, the air flow system, and the electrical system.

Another implementation of the present disclosure is a method for controlling a plurality of interconnected devices in a system. The method includes detecting that a first device of the plurality of interconnected devices is unavailable. The method further includes identifying a second device of the plurality of interconnected devices schematically dependent upon the first device by conducting a graph theory analysis on schematic relationships indicating connections among the plurality of interconnected devices. The method further includes, in response to identifying the second device schematically dependent upon the first device, generate a reduced subset of the plurality of interconnected devices that excludes the second device. The method further includes operating the reduced subset to transfer one or more resources among the reduced subset via the connections.

In some embodiments, conducting the graph theory analysis on the schematic relationships includes, in response to detecting that the first device is unavailable, updating a first matrix of available devices to indicate that the first device is unavailable, wherein the first matrix includes an availability of each device in the plurality of interconnected devices and using the first matrix to update a second matrix, wherein the second matrix identifies a connection to a node for the first device.

In some embodiments, conducting the graph theory analysis on the schematic relationships further includes using the second matrix to determine that the second device is connected to the node and is located downstream of the first device, determining that there are no devices located upstream of the node and connected to the node, and, in response to determining that there are no devices located upstream of the node and connected to the node, removing the second device from the plurality of interconnected devices to generate the reduced subset of the plurality of interconnected devices.

In some embodiments, removing the second device from the plurality of interconnected devices includes updating the first matrix to identify that the second device is unavailable, and updating the second matrix using the first matrix to remove the second device from the plurality of interconnected devices.

In some embodiments, the controller is further configured to, in response to removing the second device from the plurality of interconnected devices to generate the reduced subset, conduct the graph theory analysis repeatedly until there are no more devices of the plurality of interconnected devices that are schematically dependent on any device of the plurality of interconnected devices that is unavailable.

In some embodiments, conducting the graph theory analysis on the schematic relationships includes using a plurality of matrices to identify the second device of the plurality of interconnected devices schematically dependent upon the first device. In some embodiments, each set of elements of a matrix of the plurality of matrices in a first direction is associated with a corresponding device of the plurality of interconnected devices and each set of elements of the matrix of the plurality of matrices in a second direction is associated with a corresponding node.

In some embodiments, operating the reduced subset to transfer the one or more resources among the reduced subset via the connections includes operating the reduced subset to transfer at least one of a first fluid, wherein the system is a chiller system, and the first device is at least one of a pump, valve, storage unit, or a chiller, a second fluid, wherein the system is an air flow system, and the first device is at least one of a variable air volume (VAV) box, a damper, an actuator, or a fan, and a flow of electricity, wherein the system is an electrical system, and the first device is at least one of a motor, a generator, or an electric HVAC device.

The method of claim 15, wherein the method further includes generating the schematic relationships indicating connections among the plurality of interconnected devices using a combination of devices from a plurality of different subsystems, the plurality of different subsystems including the chiller system, the air flow system, and the electrical system.

Another implementation of the present disclosure is a control system for controlling a plurality of interconnected devices in a system. The controller includes a controller including a processing circuit configured to detect that a first device of the plurality of interconnected devices is unavailable. The processing circuit is further configured to identify a second device of the plurality of interconnected devices schematically dependent upon the first device by conducting a graph theory analysis on schematic relationships indicating connections among the plurality of interconnected devices. The processing circuit is further configured to, in response to identifying the second device schematically dependent upon the first device, generate a reduced subset of the plurality of interconnected devices that excludes the second device. The processing circuit is further configured to operate the reduced subset to transfer one or more resources among the reduced subset via the connections. The processing circuit is further configured to, in response to removing the second device from the plurality of interconnected devices to generate the reduced subset, conduct the graph theory analysis repeatedly until there are no more devices of the plurality of interconnected devices that are schematically dependent on any device of the plurality of interconnected devices that is unavailable.

In some embodiments, conducting the graph theory analysis on the schematic relationships includes, in response to detecting that the first device is unavailable, updating a first matrix of available devices to indicate that the first device is unavailable, wherein the first matrix includes an availability of each device in the plurality of interconnected devices and using the first matrix to update a second matrix, wherein the second matrix identifies a connection to a node for the first device.

In some embodiments, conducting the graph theory analysis on the schematic relationships further includes using the second matrix to determine that the second device is connected to the node and is located downstream of the first device, determining that there are no devices located upstream of the node and connected to the node, and, in response to determining that there are no devices located upstream of the node and connected to the node, removing the second device from the plurality of interconnected devices to generate the reduced subset of the plurality of interconnected devices.

In some embodiments, removing the second device from the plurality of interconnected devices includes updating the first matrix to identify that the second device is unavailable and updating the second matrix using the first matrix to remove the second device from the plurality of interconnected devices.

BRIEF DESCRIPTION OF THE DRAWINGS

FIG. 8A is an example incidence matrix of the HVAC system representing schematic connections of the HVAC system of FIG. 7A, according to some embodiments.

FIG. 8B is an example incidence matrix of the HVAC system representing schematic connections of the HVAC system of FIG. 7B, according to some embodiments.

FIG. 8C is an example incidence matrix of the HVAC system representing schematic connections of the HVAC system of FIG. 7C, according to some embodiments.

FIG. 11C is a schematic representation of a chiller system with a reduced subset of devices, which can be part of the HVAC system of FIG. 1, according to some embodiments.

DETAILED DESCRIPTION

Overview

Referring generally to the FIGURES, disclosed herein are systems and methods for determining a set of operating parameters for operating the HVAC system through disclosed computation reduction based on stranded node analysis.

In some embodiments, a central plant controller disclosed herein determines operating states of the HVAC system based on schematic dependencies of a plurality of HVAC devices of the HVAC system. In one approach, the central plant controller determines dependencies of the HVAC devices based on a stranded node analysis. A stranded node analysis herein refers to determining schematic dependencies of HVAC devices of the HVAC system by removing a HVAC device and determining any stranded node after removing the HVAC device. A stranded node is a node that is having only one of or inlets or outlets but not having a pair of inlet and outlet. If a node has one or more inlets to receive input gas or liquid without any outlet, then the node is considered a stranded node. Similarly, if a node has one or more outlets to output gas or liquid without any inlet, then the node is considered a stranded node. In one example, after removing a first HVAC device, if a second HVAC device is coupled to a stranded node, then the central plant controller determines that the second HVAC device is schematically dependent on the first HVAC device. For another example, if a third HVAC device is not coupled to any stranded node after removing the first HVAC device, then the central plant controller determines that the third HVAC device is schematically independent from the first HVAC device. Stranded node analysis disclosed herein allows the central plant controller to reduce a number of HVAC devices or operating states of the HVAC to be predicted.

Beneficially, the central plant controller improves an operation efficiency of the HVAC system by reducing computation resource for determining operating parameters of the HVAC system through stranded node analysis disclosed herein. The central plant controller may predict operating states of a reduced number of HVAC devices operating according to operating parameters of the reduced number of HVAC devices rather than the full HVAC devices of the HVAC system. As a result, the HVAC system may omit or isolate predicting operating states of disabled or turned off HVAC devices that are schematically independent from enabled or turned on HVAC devices. Consequently, the central plant controller may identify operating parameters rendering an improved performance of the HVAC system in a computationally efficient manner, and operate the HVAC system according to the determined operating parameters.

Building and HVAC System

Figure 1:
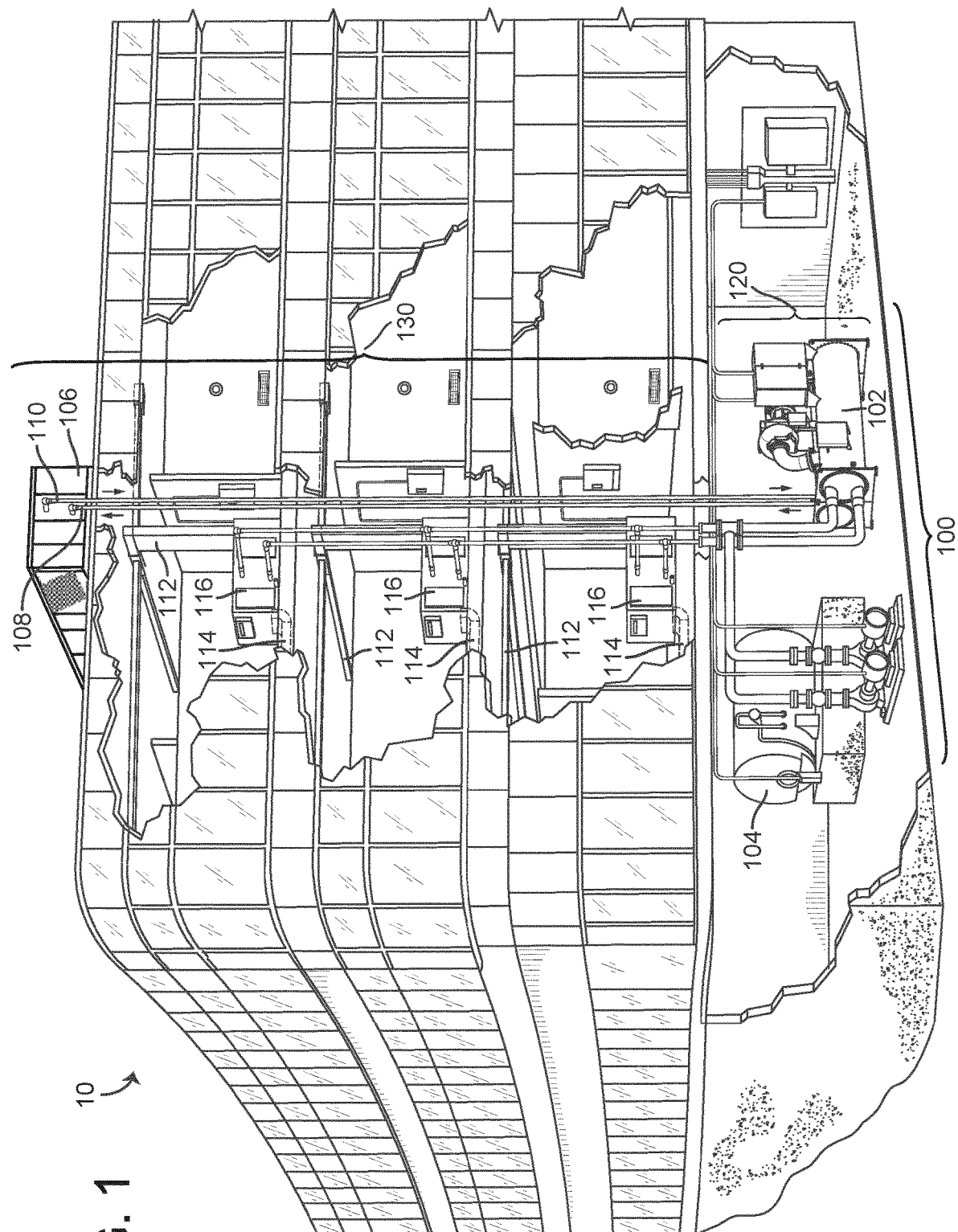
FIG. 1 is a drawing of a building equipped with an HVAC system, according to some embodiments.
Figure 2:
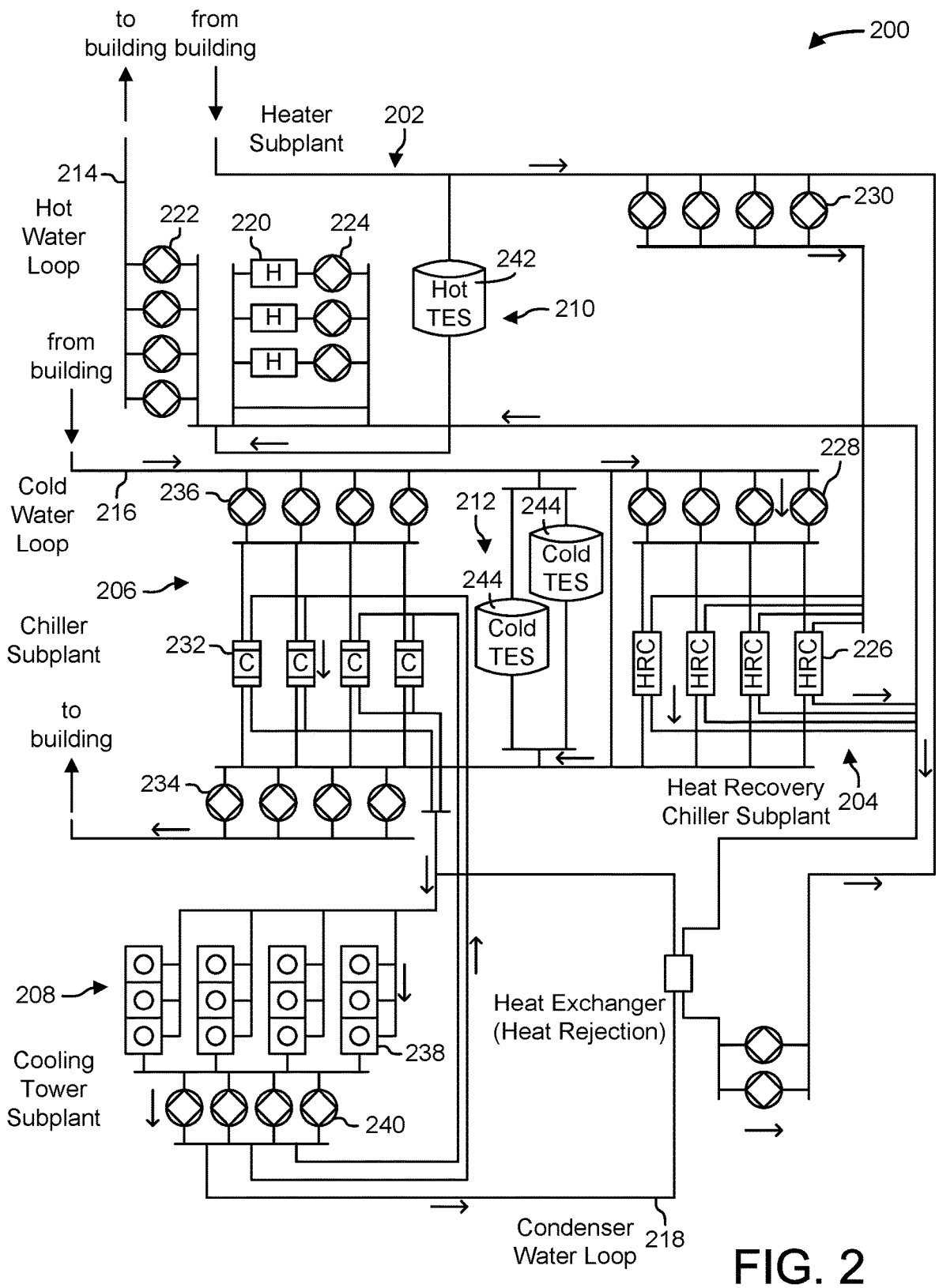
FIG. 2 is a schematic of a waterside system, which can be used as part of the HVAC system of FIG. 1, according to some embodiments.
Figure 3:
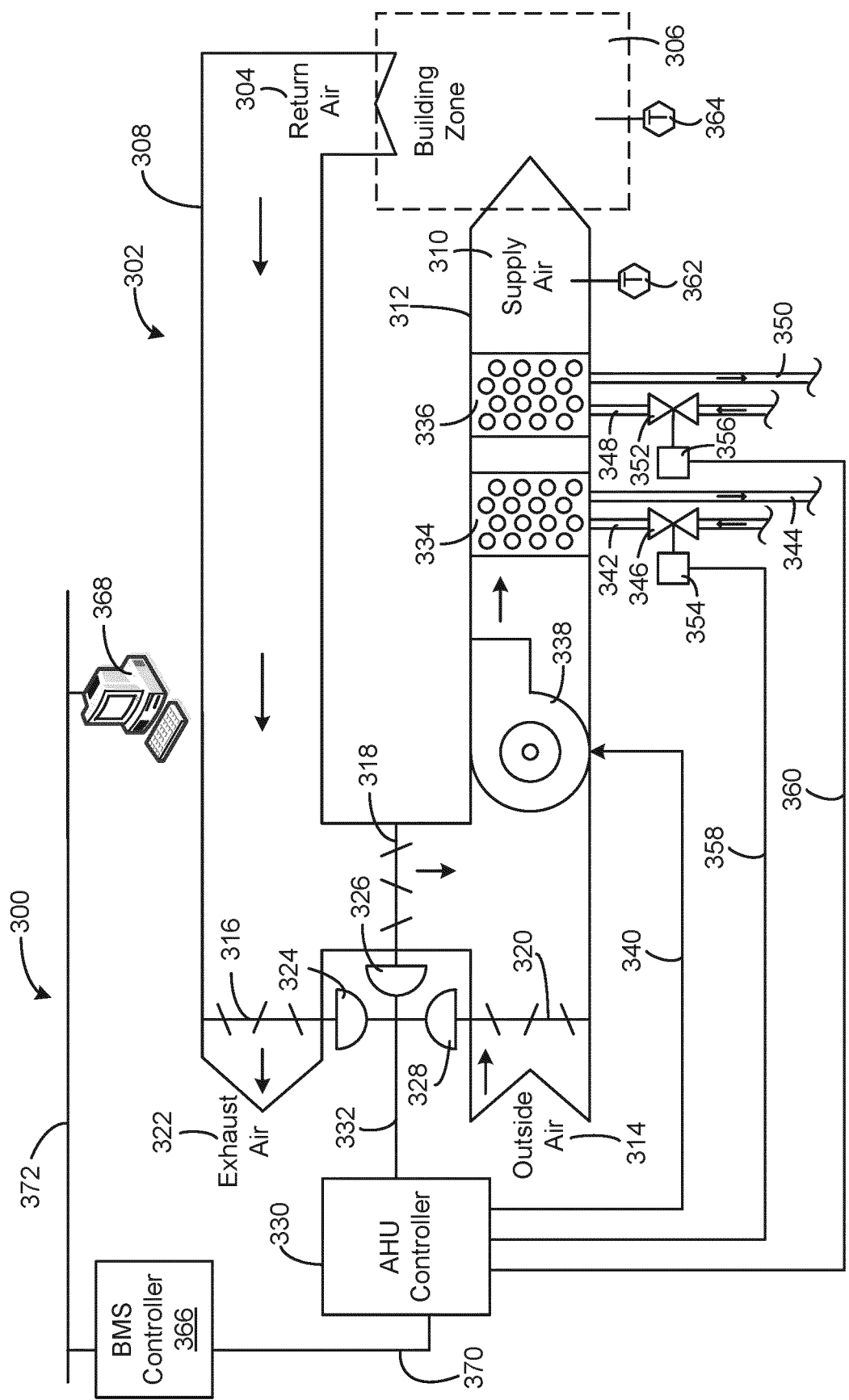
FIG. 3 is a block diagram illustrating an airside system, which can be used as part of the HVAC system of FIG. 1, according to some embodiments.

Referring now to FIGS. 1-3, an exemplary HVAC system in which the systems and methods of the present disclosure can be implemented are shown, according to an exemplary embodiment. While the systems and methods of the present disclosure are described primarily in the context of a building HVAC system, it should be understood that the control strategies described herein may be generally applicable to any type of control system.

Referring particularly to FIG. 1, a perspective view of a building 10 is shown. Building 10 is served by a building management system (BMS). A BMS is, in general, a system of devices configured to control, monitor, and manage equipment in or around a building or building area. A BMS can include, for example, an HVAC system, a security system, a lighting system, a fire alerting system, any other system that is capable of managing building functions or devices, or any combination thereof.

The BMS that serves building 10 includes an HVAC system 100. HVAC system 100 can include a plurality of HVAC devices (e.g., heaters, chillers, air handling units, pumps, fans, thermal energy storage, etc.) configured to provide heating, cooling, ventilation, or other services for building 10. For example, HVAC system 100 is shown to include a waterside system 120 and an airside system 130. Waterside system 120 can provide a heated or chilled fluid to an air handling unit of airside system 130. Airside system 130 can use the heated or chilled fluid to heat or cool an airflow provided to building 10. An exemplary waterside system and airside system which can be used in HVAC system 100 are described in greater detail with reference to FIGS. 2-3.

HVAC system 100 is shown to include a chiller 102, a boiler 104, and a rooftop air handling unit (AHU) 106. Waterside system 120 can use boiler 104 and chiller 102 to heat or cool a working fluid (e.g., water, glycol, etc.) and can circulate the working fluid to AHU 106. In various embodiments, the HVAC devices of waterside system 120 can be located in or around building 10 (as shown in FIG. 1) or at an offsite location such as a central plant (e.g., a chiller plant, a steam plant, a heat plant, etc.). The working fluid can be heated in boiler 104 or cooled in chiller 102, depending on whether heating or cooling is required in building 10. Boiler 104 can add heat to the circulated fluid, for example, by burning a combustible material (e.g., natural gas) or using an electric heating element. Chiller 102 can place the circulated fluid in a heat exchange relationship with another fluid (e.g., a refrigerant) in a heat exchanger (e.g., an evaporator) to absorb heat from the circulated fluid. The working fluid from chiller 102 and/or boiler 104 can be transported to AHU 106 via piping 108.

AHU 106 can place the working fluid in a heat exchange relationship with an airflow passing through AHU 106 (e.g., via one or more stages of cooling coils and/or heating coils). The airflow can be, for example, outside air, return air from within building 10, or a combination of both. AHU 106 can transfer heat between the airflow and the working fluid to provide heating or cooling for the airflow. For example, AHU 106 can include one or more fans or blowers configured to pass the airflow over or through a heat exchanger containing the working fluid. The working fluid can then return to chiller 102 or boiler 104 via piping 110.

Airside system 130 can deliver the airflow supplied by AHU 106 (i.e., the supply airflow) to building 10 via air supply ducts 112 and can provide return air from building 10 to AHU 106 via air return ducts 114. In some embodiments, airside system 130 includes multiple variable air volume (VAV) units 116. For example, airside system 130 is shown to include a separate VAV unit 116 on each floor or zone of building 10. VAV units 116 can include dampers or other flow control elements that can be operated to control an amount of the supply airflow provided to individual zones of building 10. In other embodiments, airside system 130 delivers the supply airflow into one or more zones of building 10 (e.g., via supply ducts 112) without using intermediate VAV units 116 or other flow control elements. AHU 106 can include various sensors (e.g., temperature sensors, pressure sensors, etc.) configured to measure attributes of the supply airflow. AHU 106 can receive input from sensors located within AHU 106 and/or within the building zone and can adjust the flow rate, temperature, or other attributes of the supply airflow through AHU 106 to achieve set-point conditions for the building zone.

Referring now to FIG. 2, a block diagram of a waterside system 200 is shown, according to an exemplary embodiment. In various embodiments, waterside system 200 can supplement or replace waterside system 120 in HVAC system 100 or can be implemented separate from HVAC system 100. When implemented in HVAC system 100, waterside system 200 can include a subset of the HVAC devices in HVAC system 100 (e.g., boiler 104, chiller 102, pumps, valves, etc.) and can operate to supply a heated or chilled fluid to AHU 106. The HVAC devices of waterside system 200 can be located within building 10 (e.g., as components of waterside system 120) or at an offsite location such as a central plant.

In FIG. 2, waterside system 200 is shown as a central plant having a plurality of subplants 202-212. Subplants 202-212 are shown to include a heater subplant 202, a heat recovery chiller subplant 204, a chiller subplant 206, a cooling tower subplant 208, a hot thermal energy storage (TES) subplant 210, and a cold thermal energy storage (TES) subplant 212. Subplants 202-212 consume resources (e.g., water, natural gas, electricity, etc.) from utilities to serve the thermal energy loads (e.g., hot water, cold water, heating, cooling, etc.) of a building or campus. For example, heater subplant 202 can be configured to heat water in a hot water loop 214 that circulates the hot water between heater subplant 202 and building 10. Chiller subplant 206 can be configured to chill water in a cold water loop 216 that circulates the cold water between chiller subplant 206 and the building 10. Heat recovery chiller subplant 204 can be configured to transfer heat from cold water loop 216 to hot water loop 214 to provide additional heating for the hot water and additional cooling for the cold water. Condenser water loop 218 can absorb heat from the cold water in chiller subplant 206 and reject the absorbed heat in cooling tower subplant 208 or transfer the absorbed heat to hot water loop 214. Hot TES subplant 210 and cold TES subplant 212 can store hot and cold thermal energy, respectively, for subsequent use.

Hot water loop 214 and cold water loop 216 can deliver the heated and/or chilled water to air handlers located on the rooftop of building 10 (e.g., AHU 106) or to individual floors or zones of building 10 (e.g., VAV units 116). The air handlers push air past heat exchangers (e.g., heating coils or cooling coils) through which the water flows to provide heating or cooling for the air. The heated or cooled air can be delivered to individual zones of building 10 to serve the thermal energy loads of building 10. The water then returns to subplants 202-212 to receive further heating or cooling.

Although subplants 202-212 are shown and described as heating and cooling water for circulation to a building, it is understood that any other type of working fluid (e.g., glycol, CO2, etc.) can be used in place of or in addition to water to serve the thermal energy loads. In other embodiments, subplants 202-212 can provide heating and/or cooling directly to the building or campus without requiring an intermediate heat transfer fluid. These and other variations to waterside system 200 are within the teachings of the present invention.

Each of subplants 202-212 can include a variety of equipment's configured to facilitate the functions of the subplant. For example, heater subplant 202 is shown to include a plurality of heating elements 220 (e.g., boilers, electric heaters, etc.) configured to add heat to the hot water in hot water loop 214. Heater subplant 202 is also shown to include several pumps 222 and 224 configured to circulate the hot water in hot water loop 214 and to control the flow rate of the hot water through individual heating elements 220. Chiller subplant 206 is shown to include a plurality of chillers 232 configured to remove heat from the cold water in cold water loop 216. Chiller subplant 206 is also shown to include several pumps 234 and 236 configured to circulate the cold water in cold water loop 216 and to control the flow rate of the cold water through individual chillers 232.

Heat recovery chiller subplant 204 is shown to include a plurality of heat recovery heat exchangers 226 (e.g., refrigeration circuits) configured to transfer heat from cold water loop 216 to hot water loop 214. Heat recovery chiller subplant 204 is also shown to include several pumps 228 and 230 configured to circulate the hot water and/or cold water through heat recovery heat exchangers 226 and to control the flow rate of the water through individual heat recovery heat exchangers 226. Cooling tower subplant 208 is shown to include a plurality of cooling towers 238 configured to remove heat from the condenser water in condenser water loop 218. Cooling tower subplant 208 is also shown to include several pumps 240 configured to circulate the condenser water in condenser water loop 218 and to control the flow rate of the condenser water through individual cooling towers 238.

Hot TES subplant 210 is shown to include a hot TES tank 242 configured to store the hot water for later use. Hot TES subplant 210 can also include one or more pumps or valves configured to control the flow rate of the hot water into or out of hot TES tank 242. Cold TES subplant 212 is shown to include cold TES tanks 244 configured to store the cold water for later use. Cold TES subplant 212 can also include one or more pumps or valves configured to control the flow rate of the cold water into or out of cold TES tanks 244.

In some embodiments, one or more of the pumps in waterside system 200 (e.g., pumps 222, 224, 228, 230, 234, 236, and/or 240) or pipelines in waterside system 200 include an isolation valve associated therewith. Isolation valves can be integrated with the pumps or positioned upstream or downstream of the pumps to control the fluid flows in waterside system 200. In various embodiments, waterside system 200 can include more, fewer, or different types of devices and/or subplants based on the particular configuration of waterside system 200 and the types of loads served by waterside system 200.

Referring now to FIG. 3, a block diagram of an airside system 300 is shown, according to an exemplary embodiment. In various embodiments, airside system 300 can supplement or replace airside system 130 in HVAC system 100 or can be implemented separate from HVAC system 100. When implemented in HVAC system 100, airside system 300 can include a subset of the HVAC devices in HVAC system 100 (e.g., AHU 106, VAV units 116, ducts 112-114, fans, dampers, etc.) and can be located in or around building 10. Airside system 300 can operate to heat or cool an airflow provided to building 10 using a heated or chilled fluid provided by waterside system 200.

In FIG. 3, airside system 300 is shown to include an economizer-type air handling unit (AHU) 302. Economizer-type AHUs vary the amount of outside air and return air used by the air handling unit for heating or cooling. For example, AHU 302 can receive return air 304 from building zone 306 via return air duct 308 and can deliver supply air 310 to building zone 306 via supply air duct 312. In some embodiments, AHU 302 is a rooftop unit located on the roof of building 10 (e.g., AHU 106 as shown in FIG. 1) or otherwise positioned to receive return air 304 and outside air 314. AHU 302 can be configured to operate an exhaust air damper 316, mixing damper 318, and outside air damper 320 to control an amount of outside air 314 and return air 304 that combine to form supply air 310. Any return air 304 that does not pass through mixing damper 318 can be exhausted from AHU 302 through exhaust air damper 316 as exhaust air 322.

Each of dampers 316-320 can be operated by an actuator. For example, exhaust air damper 316 can be operated by actuator 324, mixing damper 318 can be operated by actuator 326, and outside air damper 320 can be operated by actuator 328. Actuators 324-328 can communicate with an AHU controller 330 via a communications link 332. Actuators 324-328 can receive control signals from AHU controller 330 and can provide feedback signals to AHU controller 330. Feedback signals can include, for example, an indication of a current actuator or damper position, an amount of torque or force exerted by the actuator, diagnostic information (e.g., results of diagnostic tests performed by actuators 324-328), status information, commissioning information, configuration settings, calibration data, and/or other types of information or data that can be collected, stored, or used by actuators 324-328. AHU controller 330 can be an economizer controller configured to use one or more control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control actuators 324-328.

Still referring to FIG. 3, AHU 302 is shown to include a cooling coil 334, a heating coil 336, and a fan 338 positioned within supply air duct 312. Fan 338 can be configured to force supply air 310 through cooling coil 334 and/or heating coil 336 and provide supply air 310 to building zone 306. AHU controller 330 can communicate with fan 338 via communications link 340 to control a flow rate of supply air 310. In some embodiments, AHU controller 330 controls an amount of heating or cooling applied to supply air 310 by modulating a speed of fan 338.

Cooling coil 334 can receive a chilled fluid from waterside system 200 (e.g., from cold water loop 216) via piping 342 and can return the chilled fluid to waterside system 200 via piping 344. Valve 346 can be positioned along piping 342 or piping 344 to control a flow rate of the chilled fluid through cooling coil 334. In some embodiments, cooling coil 334 includes multiple stages of cooling coils that can be independently activated and deactivated (e.g., by AHU controller 330, by BMS controller 366, etc.) to modulate an amount of cooling applied to supply air 310.

Heating coil 336 can receive a heated fluid from waterside system 200 (e.g., from hot water loop 214) via piping 348 and can return the heated fluid to waterside system 200 via piping 350. Valve 352 can be positioned along piping 348 or piping 350 to control a flow rate of the heated fluid through heating coil 336. In some embodiments, heating coil 336 includes multiple stages of heating coils that can be independently activated and deactivated (e.g., by AHU controller 330, BMS controller 366, etc.) to modulate an amount of heating applied to supply air 310.

Each of valves 346 and 352 can be controlled by an actuator. For example, valve 346 can be controlled by actuator 354 and valve 352 can be controlled by actuator 356. Actuators 354-356 can communicate with AHU controller 330 via communications links 358-360. Actuators 354-356 can receive control signals from AHU controller 330 and can provide feedback signals to AHU controller 330. In some embodiments, AHU controller 330 receives a measurement of the supply air temperature from a temperature sensor 362 positioned in supply air duct 312 (e.g., downstream of cooling coil 334 and/or heating coil 336). AHU controller 330 can also receive a measurement of the temperature of building zone 306 from a temperature sensor 364 located in building zone 306.

In some embodiments, AHU controller 330 operates valves 346 and 352 via actuators 354-356 to modulate an amount of heating or cooling provided to supply air 310 (e.g., to achieve a set-point temperature for supply air 310 or to maintain the temperature of supply air 310 within a set-point temperature range). The positions of valves 346 and 352 affect the amount of heating or cooling provided to supply air 310 by heating coil 336 or cooling coil 334 and may correlate with the amount of energy consumed to achieve a desired supply air temperature. AHU controller 330 can control the temperature of supply air 310 and/or building zone 306 by activating or deactivating coils 334-336, adjusting a speed of fan 338, or a combination thereof.

Still referring to FIG. 3, airside system 300 is shown to include a BMS controller 366 and a client device 368. BMS controller 366 can include one or more computer systems (e.g., servers, supervisory controllers, subsystem controllers, etc.) that serve as system level controllers, application or data servers, head nodes, or master controllers for airside system 300, waterside system 200, HVAC system 100, and/or other controllable systems that serve building 10. BMS controller 366 can communicate with multiple downstream building systems or subsystems (e.g., HVAC system 100, a security system, a lighting system, waterside system 200, etc.) via a communications link 370 according to like or disparate protocols (e.g., LON, BACnet, etc.). In various embodiments, AHU controller 330 and BMS controller 366 can be separate (as shown in FIG. 3) or integrated. The AHU controller 330 may be a hardware module, a software module configured for execution by a processor of BMS controller 366, or both.

In some embodiments, AHU controller 330 receives information (e.g., commands, set points, operating boundaries, etc.) from BMS controller 366 and provides information (e.g., temperature measurements, valve or actuator positions, operating statuses, diagnostics, etc.) to BMS controller 366. For example, AHU controller 330 can provide BMS controller 366 with temperature measurements from temperature sensors 362-364, equipment on/off states, equipment operating capacities, and/or any other information that can be used by BMS controller 366 to monitor or control a variable state or condition within building zone 306.

Client device 368 can include one or more human-machine interfaces or client interfaces (e.g., graphical user interfaces, reporting interfaces, text-based computer interfaces, client-facing web services, web servers that provide pages to web clients, etc.) for controlling, viewing, or otherwise interacting with HVAC system 100, its subsystems, and/or devices. Client device 368 can be a computer workstation, a client terminal, a remote or local interface, or any other type of user interface device. Client device 368 can be a stationary terminal or a mobile device. For example, client device 368 can be a desktop computer, a computer server with a user interface, a laptop computer, a tablet, a smartphone, a PDA, or any other type of mobile or non-mobile device. Client device 368 can communicate with BMS controller 366 and/or AHU controller 330 via communications link 372.

Example Climate Control System

Figure 4:
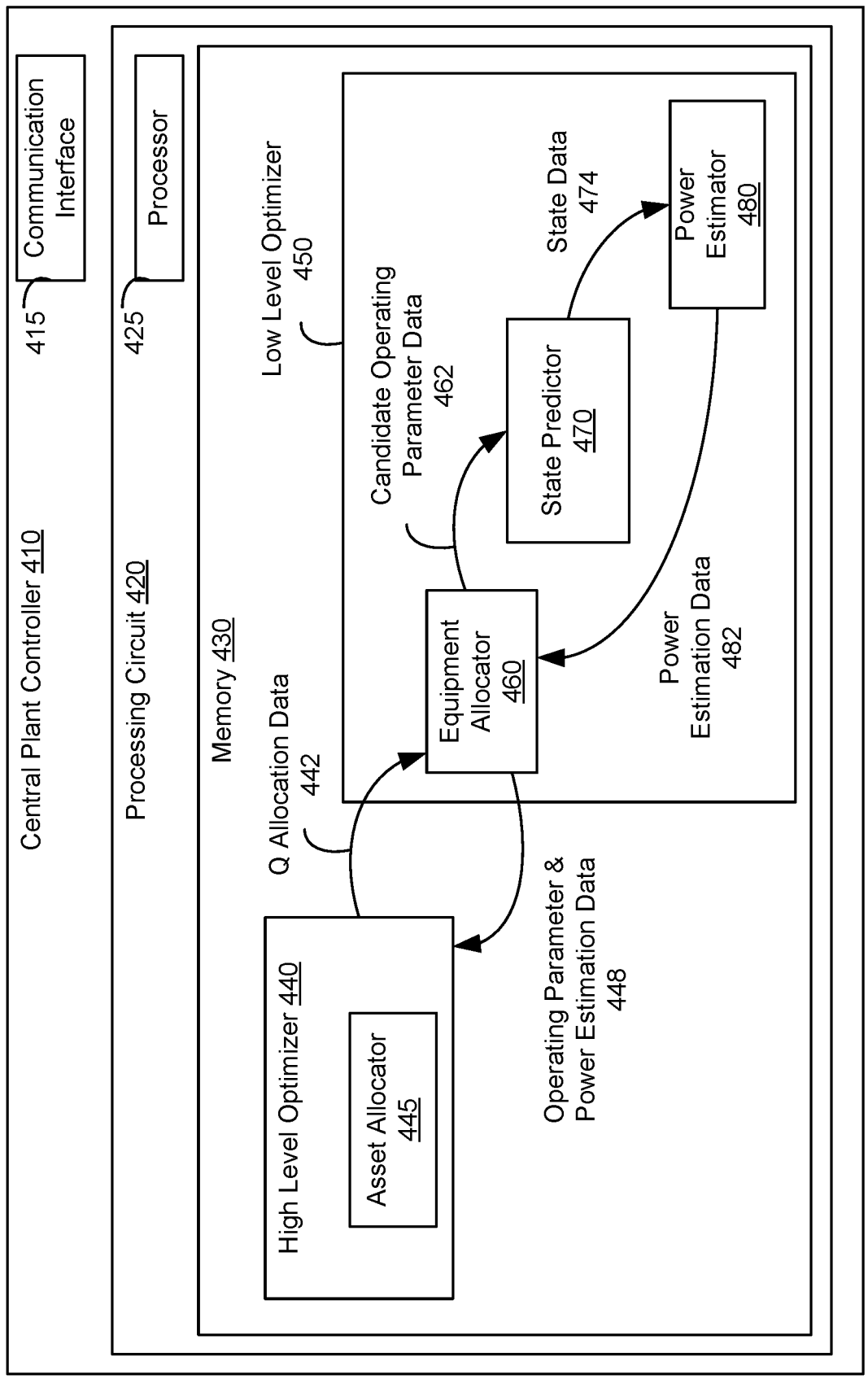
FIG. 4 is a block diagram of a central plant controller, according to some embodiments.

Referring to FIG. 4, illustrated is a block diagram of a central plant controller 410, according to some embodiments. In some embodiments, the central plant controller 410 is part of the HVAC system 100 of FIG. 1. Alternatively, the central plant controller 410 is coupled to the HVAC system 100 through a communication link. The central plant controller 410 may be the AHU controller 330 of FIG. 3, or a combination of the BMS controller 366 and the AHU controller 330 of FIG. 3. In one configuration, the central plant controller 410 includes a communication interface 415, and a processing circuit 420. These components operate together to determine a set of operating parameters for operating various HVAC devices of the HVAC system 100. In some embodiments, the central plant controller 410 includes additional, fewer, or different components than shown in FIG. 4.

The communication interface 415 facilitates communication of the central plant controller 410 with other HVAC devices (e.g., heaters, chillers, air handling units, pumps, fans, thermal energy storage, etc.). The communication interface 415 can be or include wired or wireless communications interfaces (e.g., jacks, antennas, transmitters, receivers, transceivers, wire terminals, etc.). In various embodiments, communications via the communication interface 415 can be direct (e.g., local wired or wireless communications) or via a communications network (e.g., a WAN, the Internet, a cellular network, etc.). For example, the communication interface 415 can include an Ethernet/USB/RS232/RS485 card and port for sending and receiving data through a network. In another example, the communication interface 415 can include a Wi-Fi transceiver for communicating via a wireless communications network. In another example, the communication interface 415 can include cellular or mobile phone communication transceivers.

The processing circuit 420 is a hardware circuit executing instructions to determine a set of parameters for operating HVAC devices of the HVAC system 100. In one embodiment, the processing circuit 420 includes a processor 425, and memory 430 storing instructions (or program code) executable by the processor 425. The memory 430 may be any non-transitory computer readable medium. In one embodiment, the instructions executed by the processor 425 cause the processor 425 to form software modules including a high level optimizer 440, and a low level optimizer 450. The high level optimizer 440 may determine how to distribute thermal energy loads across HVAC devices (e.g., subplants, chillers, heaters, valves, etc.) for each time step in the prediction window, for example, to minimize the cost of energy consumed by the HVAC devices. The low level optimizer 450 may determine how to operate each subplant according to the thermal energy loads determined by the high level optimizer 440. In other embodiments, the processor 425 and the memory 430 may be omitted, and the high level optimizer 440 and the low level optimizer 450 may be implemented as hardware modules by a reconfigurable circuit (e.g., field programmable gate array (FPGA)), an application specific integrated circuit (ASIC), or any circuitries, or a combination of software modules and hardware modules.

In one implementation, the high level optimizer 440 determines thermal energy loads of HVAC devices of the HVAC system 100, and generates Q allocation data 442 indicating the determined thermal energy loads. The high level optimizer 440 may provide the Q allocation data 442 to the low level optimizer 450. In return, the high level optimizer 440 may receive, from the low level optimizer 450, operating parameter and power estimation data 448 indicating a set of operating parameters to operate HVAC devices of the HVAC system 100, predicted power consumptions when operating the HVAC system 100 according to the set of operating parameters, or both. Based on the operating parameter and power estimation data 448, the high level optimizer 440 can operate the HVAC system 100 accordingly or generate different Q allocation data 442 for further optimization. The high level optimizer 440 and the low level optimizer 450 may operate together online in real time, or offline at different times.

In one or more embodiments, the high level optimizer 440 includes an asset allocator 445 that determines a distribution of thermal energy loads of the HVAC devices of the HVAC system 100 based on a predicted thermal energy load of the HVAC system 100. In some embodiments, the asset allocator 445 determines the optimal load distribution by minimizing the total operating cost of HVAC system 100 over the prediction time window. In one aspect, given a predicted thermal energy load $\hat{l}_k$ and utility rate information received through a user input or automatically determined by a scheduler (not shown), the asset allocator 445 may determine a distribution of the predicted thermal energy load $\hat{l}_k$ across subplants to minimize the cost. The asset allocator 445 generates the Q allocation data 442 indicating the predicted loads $\hat{l}_k$ of different HVAC devices of the HVAC system 100 and provides the Q allocation data 442 to the low level optimizer 450.

In some embodiments, distributing thermal energy load includes causing TES subplants to store thermal energy during a first time step for use during a later time step. Thermal energy storage may advantageously allow thermal energy to be produced and stored during a first time period when energy prices are relatively low and subsequently retrieved and used during a second time period when energy prices are relatively high. The high level optimization may be different from the low level optimization in that the high level optimization has a longer time constant due to the thermal energy storage provided by TES subplants. The high level optimization may be described by the following equation:

$$\theta^*_{HL} = \underset{\theta_{HL}}{\mathrm{argmin}} J_{HL}(\theta_{HL}) \quad \text{Eq. (1)}$$

where $\theta^*_{HL}$ contains the optimal high level decisions (e.g., the optimal load $\dot{Q}$ for each of subplants) for the entire prediction period and $J_{HL}$ is the high level cost function.

To find the optimal high level decisions $\theta^*_{HL}$, the asset allocator 445 may minimize the high level cost function $J_{HL}$. The high level cost function $J_{HL}$ may be the sum of the economic costs of each utility consumed by each of subplants for the duration of the prediction time period. For example, the high level cost function $J_{HL}$ may be described using the following equation:

$$J_{HL}(\theta_{HL}) = \sum_{k=1}^{n_h} \sum_{i=1}^{n_s} \left[ \sum_{j=1}^{n_u} t_s \cdot c_{jk} u_{jik}(\theta_{HL}) \right] \quad \text{Eq. (2)}$$

where $n_h$ is the number of time steps k in the prediction time period, $n_s$ is the number of subplants, $t_s$ is the duration of a time step, $c_{jk}$ is the economic cost of utility j at a time step k of the prediction period, and $u_{jik}$ is the rate of use of utility j by subplant i at time step k. In some embodiments, the cost function $J_{HL}$ includes an additional demand charge term such as:

$$w_d c_{demand} \underset{n_h}{\max}(u_{elec}(\theta_{HL}), u_{max,ele}) \quad \text{Eq. (3)}$$

where $w_d$ is a weighting term, $c_{demand}$ is the demand cost, and the max( ) term selects the peak electricity use during the applicable demand charge period.

In some embodiments, the high level optimization performed by the high level optimizer 440 is the same or similar to the high level optimization process described in U.S. patent application Ser. No. 14/634,609 filed Feb. 27, 2015 and titled "High Level Central Plant Optimization," which is incorporated by reference herein.

The low level optimizer 450 receives the Q allocation data 442 from the high level optimizer 440, and determines operating parameters (e.g., capacities) of the HVAC devices of the HVAC system 100. In one or more embodiments, the low level optimizer 450 includes an equipment allocator 460, a state predictor 470, and a power estimator 480. Together, these components operate to determine a set of operating parameters, for example, rendering reduced power consumption of the HVAC system 100 for a given set of thermal energy loads indicated by the Q allocation data 442, and generate operating parameter data indicating the determined set of operating parameters. Particularly, the low level optimizer 450 determines the set of operating parameters based on schematic dependence of the operating parameters on a performance of the HVAC system 100. In some embodiments, the low level optimizer 450 includes different, more, or fewer components, or includes components in different arrangements than shown in FIG. 4.

In one configuration, the equipment allocator 460 receives the Q allocation data 442 from the high level optimizer 440, and generates candidate operating parameter data 462 indicating a set of candidate operating parameters of HVAC devices of the HVAC system 100. The state predictor 470 receives the candidate operating parameter data 462 and predicts thermodynamic states of the HVAC system 100 at various locations for the set of candidate operating parameters. The state predictor 470 generates state data 474 indicating the predicted thermodynamic states, and provides the state data 474 to the power estimator 480. The power estimator 480 predicts, based on the state data 474, total power consumed by the HVAC system 100 operating according to the set of candidate operating parameters, and generates the power estimation data 482 indicating the predicted power consumption. The equipment allocator 460 may repeat the process with different sets of candidate operating parameters to obtain predicted power consumptions of the HVAC system 100 operating according to different sets of candidate operating parameters, and select a set of operating parameters rendering lower power consumption. The equipment allocator 460 may generate the operating parameter and power estimation data 448 indicating (i) the selected set of operating parameters and (ii) predicted power consumption of the power plant when operating according to the selected set of operating parameters, and provide the operating parameter and power estimation data 448 to the high level optimizer 440.

The equipment allocator 460 is a component that interfaces with the high level optimizer 440. In one aspect, the equipment allocator 460 receives the Q allocation data, and determines a candidate set of operating parameters of HVAC devices of the HVAC system 100. For example, the equipment allocator 460 determines that a first chiller is assigned to operate with a first range of thermal energy load and a second chiller is assigned to operate with a second range of thermal energy load based on the Q allocation data. In this example, the equipment allocator 460 may determine that operating parameters (e.g., between 30% to 50% capacity) of the first chiller can achieve the first range of thermal energy load and operating parameters (e.g., between 60~65% capacity) of the second chiller can achieve the second range of thermal energy load. From different combinations of operating parameters of the first chiller and the second chiller, the equipment allocator 460 selects a candidate set of operating parameters (e.g., 45% capacity of the first chiller and 60% capacity of the second chiller) satisfying loads specified by the Q allocation data 442. Additionally, the equipment allocator 460 generates the candidate operating parameter data 462 indicating the selected candidate set of operating parameters, and provides the candidate operating parameter data 462 to the state predictor 470.

The state predictor 470 predicts an operating condition of the HVAC system 100 based on a set of operating parameters of the HVAC system 100 as indicated by the candidate operating parameter data 462. The operating condition of the HVAC system 100 includes thermodynamic states at various locations of the HVAC system 100. Examples of thermodynamic states include input pressure value, output pressure value, input mass flow value, output mass flow value, input enthalpy value, output enthalpy value, etc. In one approach, predicting thermodynamic states of the HVAC system 100 includes applying the set of operating parameters to a linear solver and a non-linear solver. Generally, the non-linear solver consumes a large amount of resources (e.g., processor threads and storage capacity) to obtain a solution. In one or more embodiments, the state predictor 470 reduces a number of unknown thermodynamic states to be predicted based on schematic arrangements of HVAC devices of the HVAC system 100, and may further reduce the number of unknown thermodynamic states to be predicted by propagating known thermodynamic states based on the operating parameters using the linear solver, as described in detail below with respect to FIGS. 5 through 10. Advantageously, a fewer number of unknown thermodynamic states can be determined by the non-linear solver, thereby improving efficiency of predicting the thermodynamic states for the set of operating parameters. The state predictor 470 generates state data 474 indicating the predicted thermodynamic states for the candidate set of operating parameters, and provides the state data 474 to the power estimator 480.

The power estimator 480 predicts power consumed by the HVAC system 100 based on the state data 474. In one approach, the power estimator 480 determines, for each HVAC device, a predicted power consumption based on thermodynamic states (e.g., pressure values, mass flow values, enthalpy values, etc.) and an operating parameter (e.g., capacity) of the HVAC device. In addition, the power estimator 480 may add power consumptions of the HVAC devices of the HVAC system 100 to obtain a total power consumption of the HVAC system 100. The power estimator 480 generates the power estimation data 482 indicating the total power consumption of the HVAC system 100, power consumption of each HVAC device, or any combination of them, and provides the power estimation data 482 to the equipment allocator 460.

In some embodiments, the equipment allocator 460 compares predicted power consumptions of the HVAC system 100 for multiple sets of operating parameters, and selects a set of operating parameters for operating the HVAC system 100. In one approach, the equipment allocator 460 selects, from the multiple sets of operating parameters, the set of operating parameters rendering the lowest power consumption. Hence, the HVAC system 100 operating based on the set of operating parameters determined by the equipment allocator 460 benefits from reduced power consumption. The equipment allocator 460 may generate the operating parameter and power estimation data 448 indicating the set of operating parameters to operate HVAC devices of the HVAC system 100, predicted power consumptions when operating the HVAC system 100 according to the set of operating parameters, or any combination of them, and provide the operating parameter and power estimation data 448 to the high level optimizer 440.

In some embodiments, the equipment allocator 460 performs stranded node analysis to identify a reduced group of the operating parameters for determining a set of operating parameters rendering an improved performance (e.g., lower power consumption) of the HVAC system. The stranded node analysis includes determining schematic dependencies of HVAC devices of the HVAC system by removing a device and determining any stranded node after removing the device. For example, after removing a first HVAC device, if a second HVAC device is coupled to a stranded node, then the equipment allocator 460 determines that the second HVAC device is schematically dependent on the first HVAC device. For another example, if a third HVAC device is not coupled to any stranded node after removing the first HVAC device, then the equipment allocator 460 determines that the third HVAC device is schematically independent from the first HVAC device. Based on the stranded node analysis, the equipment allocator 460 allows the state predictors to omit predicting operating states of a disabled or turned off HVAC device and additional HVAC devices schematically dependent on the disabled or turned off HVAC device. Hence, the state predictor 470 may perform computation for a fewer number of unknowns.

Figure 5:
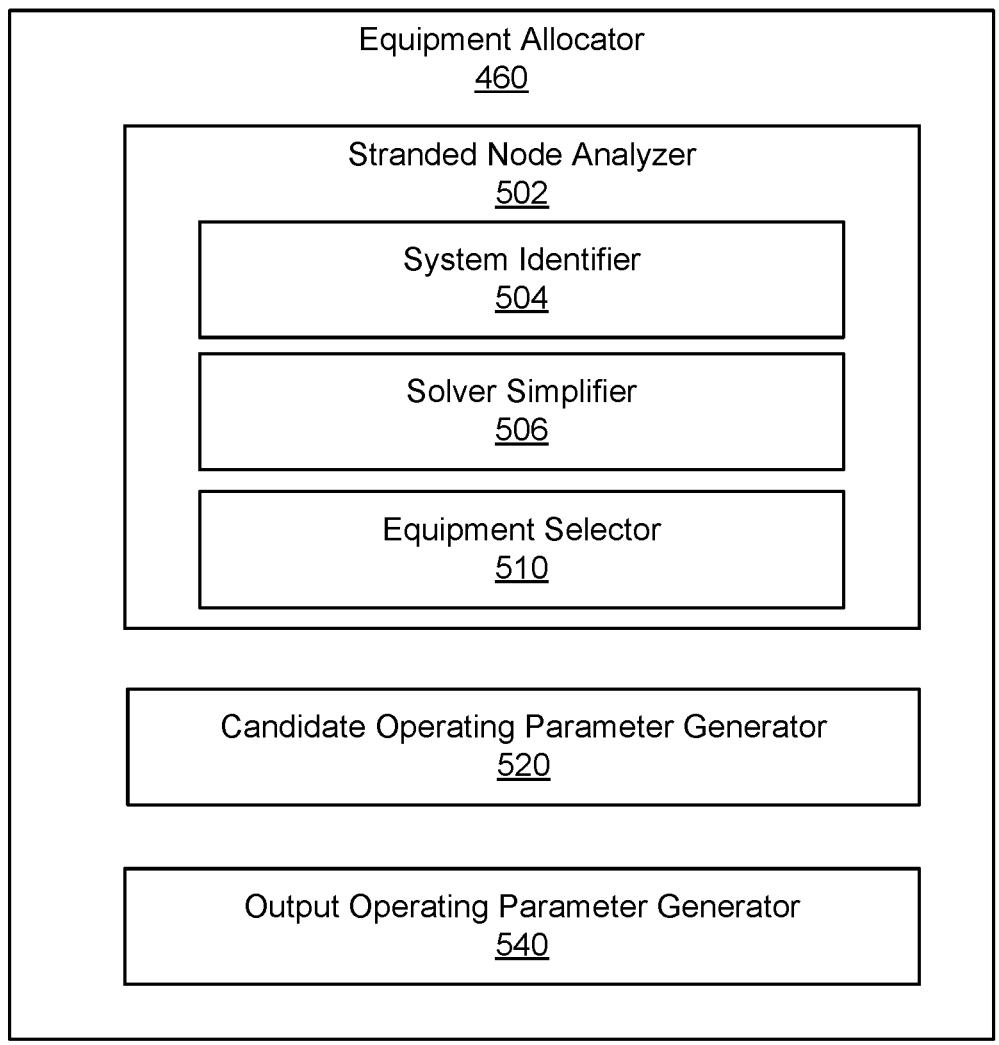
FIG. 5 is a block diagram of an equipment allocator of FIG. 4, according to some embodiments.

Referring to FIG. 5, illustrated is a block diagram of the equipment allocator 460, according to some embodiments. In one configuration, the equipment allocator 460 includes a stranded node analyzer 502, a candidate operating parameter generator 520, and an output operating parameter generator 540. These components operate together to determine a set of operating parameters rendering an improved performance of the HVAC system for a reduced number of HVAC devices according to stranded node analysis, and generate operating parameter and power estimation data 448 indicating the determined set of operating parameters and corresponding power consumption of the HVAC system. In some embodiments, the equipment allocator 460 includes additional, fewer, or different components than shown in FIG. 5.

The stranded node analyzer 502 is a component that performs stranded node analysis to determine schematic dependencies of HVAC devices. In one implementation, the stranded node analyzer 502 includes a system identifier 504, a solver simplifier 506, and an equipment selector 510. In this configuration, the stranded node analyzer 502 determines schematic dependencies of the HVAC devices, and determines a reduced number of operating states of the HVAC devices to be predicted. In some embodiments, the stranded node analyzer 502 includes additional, fewer, or different components than shown in FIG. 5.

The system identifier 504 is a component that obtains plant netlist data indicating schematic arrangement of the HVAC devices, and performs stranded node analysis based on the plant netlist data to determine dependencies of the HVAC devices. The plant netlist data describe a plurality of HVAC devices (e.g., chillers, boilers, pumps, fans, valves, etc.) of the HVAC system and schematic connections thereof. For example, the schematic arrangement of the HVAC devices of the HVAC system can be represented by plant netlist data as shown below.

| Example Plant Netlist | | | | |
|---|---|---|---|---|
| LC | ColdLoad | N4 | N1 | CHW |
| CHWP | PCHWP1 | N1 | N2 | CHW |
| CHWP | PCHWP2 | N1 | N3 | CHW |
| CHLR | Chiller1 | N2 | N4 | CHW |
| CHLR | Chiller2 | N3 | N4 | CHW |

The plant netlist data may be automatically generated based on a graphical user interface allowing a user to schematically define connections of the plurality of HVAC devices. Alternatively, the plant netlist data may be manually entered by a user through a text editor. Schematically representing arrangements of the HVAC devices of the HVAC system enables the state predictor 470 to reduce a number of unknown thermodynamic states to be determined. For example, the HVAC device may determine dependencies of the plurality of HVAC devices, and determine to omit prediction of operating states of one or more HVAC devices that do not contribute to the operation of the HVAC system or do not contribute to a change in the operation of the HVAC system.

In one approach, the system identifier 504 obtains an incidence matrix A representing schematic connections of HVAC devices of the HVAC system in a matrix format based on the netlist data. The incidence matrix A may be an n by m matrix. In one embodiment, each row is associated with a corresponding HVAC device and each column is associated with a corresponding node. In this embodiment, n represents the number of HVAC devices, and m represents the number of nodes. In another embodiment, each row is associated with a corresponding node and each column is associated with a corresponding HVAC device. In this embodiment, n represents the number of nodes, and m represents the number of HVAC devices. Although following descriptions are provided with the incidence matrix with rows corresponding HVAC devices and columns corresponding to nodes, principles disclosed herein may be applied to an incidence matrix with rows corresponding to nodes and rows corresponding to HVAC devices. A HVAC device coupled to a node through an input of the HVAC device may have a value of −1, and a HVAC device coupled to the node through an output of the HVAC device may have a value of 1. For example, the incidence matrix generator 620 obtains the following incidence matrix A for the example schematic representation 500 shown in FIG. 5.

$$A = \begin{bmatrix} -1 & 1 & 0 & 0 \\ -1 & 0 & 1 & 0 \\ 0 & -1 & 0 & 1 \\ 0 & 0 & -1 & 1 \\ 1 & 0 & 0 & -1 \end{bmatrix} \quad \text{Eq. (4)}$$

By modifying the incidence matrix A, the system identifier 504 may remove an HVAC device, and determine whether other devices are schematically dependent on the removed HVAC device. For example, after removing a first HVAC device, a second HVAC device coupled to a stranded node (or a floating node) is determined to be schematically dependent on the first HVAC device. On the other hand, after removing the first HVAC device, a third HVAC device not coupled to any stranded node (or any floating node) is determined to be schematically independent from the first HVAC device. In one approach, the system identifier 504 substitutes values of a row of the incidence matrix A corresponding to a selected HVAC device with zero, and analyzes each column of the incidence matrix A. If a column contains a nonzero value but no longer contains a pair of '1' and '−1', then one or more rows in the incidence matrix A that contain nonzero values in that column indicates that corresponding HVAC devices are schematically dependent on the selected HVAC device. The system identifier 504 may iteratively identify additional schematically dependent HVAC devices by further removing schematically dependent HVAC devices, and determining whether any column has either '1' or '−1' but no longer contains a pair of '1' and a '−1' value. The solver simplifier 506 may generate a look up table indicating dependencies of the HVAC devices. A detailed example process of stranded node analysis is provided below with respect to FIGS. 6A-C, 7A-7C, and 8A-8C. Accordingly, the system identifier 504 may identify schematically dependent and independent HVAC devices through the incident matrix A.

The solver simplifier 506 generates a simplified list of HVAC devices based on schematic dependencies of the HVAC devices. For example, the solver simplifier 506 obtains a list of HVAC devices that are enabled (turned on) or disabled (turned off) from the high level optimizer 440. The solver simplifier 506 may remove or exclude devices schematically dependent on disabled HVAC devices from the list of HVAC devices. The solver simplifier 506 may include devices schematically dependent on enabled HVAC devices from the list of HVAC devices. The solver simplifier 506 may perform the process of modifying the incident matrix A as illustrated above to obtain the simplified list of HVAC devices.

The equipment selector 510 is a component that receives the Q allocation data 442 from the high level optimizer 440, and determines a set of operating parameters of the HVAC system according to the Q allocation data 442. In one implementation, the equipment selector 510 stores a look up table indicating a relationship between thermal energy loads and corresponding sets or ranges of operating parameters of the HVAC system. For example, the equipment selector 510 receives the Q allocation data 442 indicating a target thermal energy load of a heater and a target thermal energy load of a cooler. In this example, the equipment selector 510 may determine that a first range of the operating parameter of the heater corresponds to the target thermal energy load of the heater and a second range of the operating parameter of the heater corresponds to the target thermal energy load of the cooler based on the look up table. In one aspect, the equipment selector 510 determines a set of operating parameters of HVAC devices in the simplified list from the solver simplifier 506.

The candidate operating parameter generator 520 is a component that interfaces with the state predictor 470, and generates candidate operating parameter data 462 based on the operating parameters of the HVAC system. The candidate operating parameter generator 520 may generate the candidate operating parameter data 462 based on operating parameters of the HVAC devices in the simplified list from the equipment allocator 460. The candidate operating parameter generator 520 may provide the candidate operating parameter data 462 to the state predictor 470. Because the candidate operating parameter data 462 indicates operating parameters of the HVAC devices in the simplified list, rather than operating parameters of full HVAC devices of the HVAC system, computation resources for predicting operating states of the HVAC devices by the state predictor 470 may be conserved.

The output operating parameter generator 540 is a component that determines a set of operating parameters for operating the HVAC system, and provides the operating parameter and power estimation data 448 indicating the set of operating parameters and predicted power consumption. In one example, the output operating parameter generator 540 determines, from different sets of operating parameters, the set of operating parameters rendering the lowest power consumption.

Figure 6A:
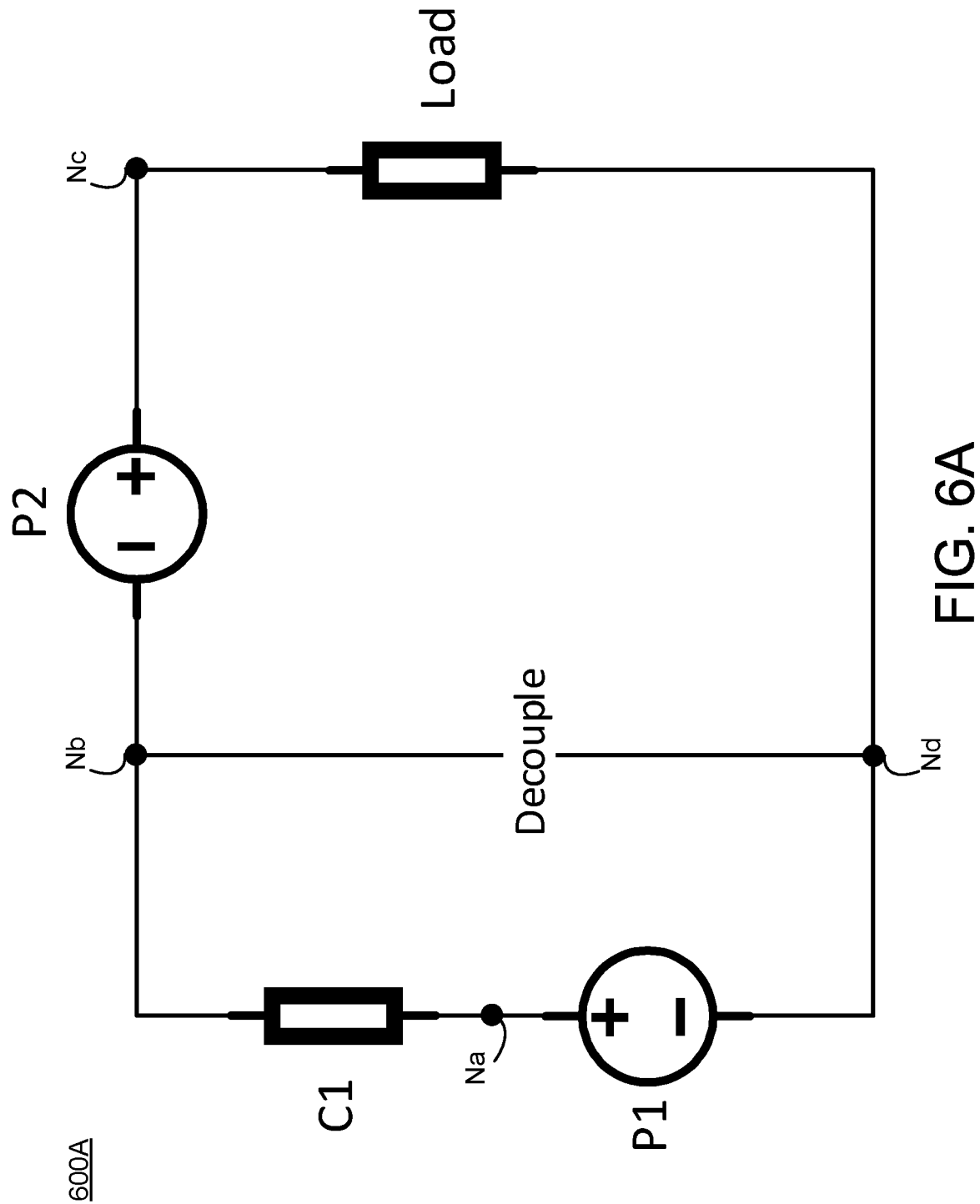
FIG. 6A illustrates an example schematic representation of an HVAC system, according to some embodiments.
Figure 6B:
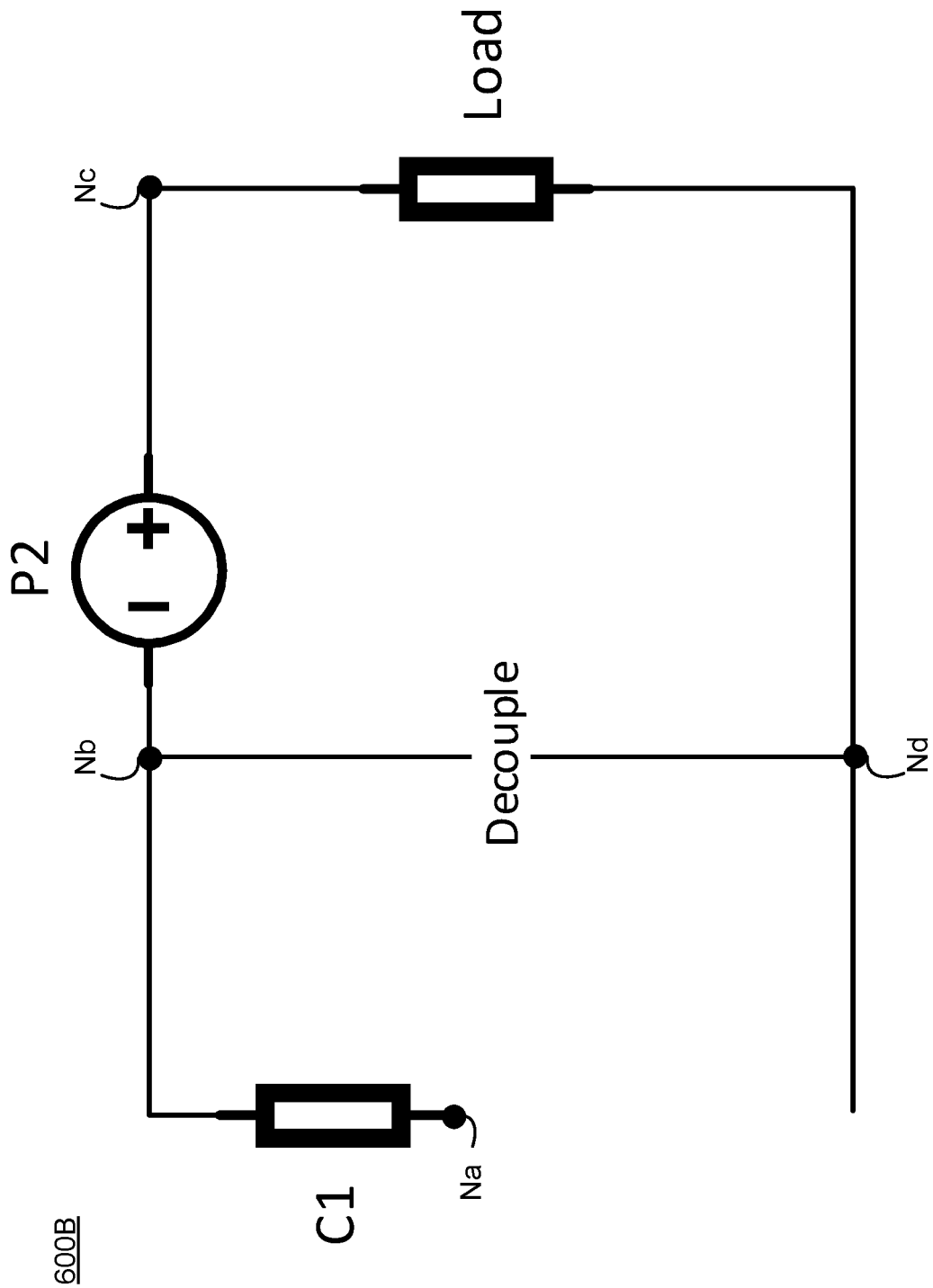
FIG. 6B illustrates an example schematic representation of the HVAC system with a device removed from the schematic representation shown in FIG. 6A for performing stranded node analysis, according to some embodiments.
Figure 6C:
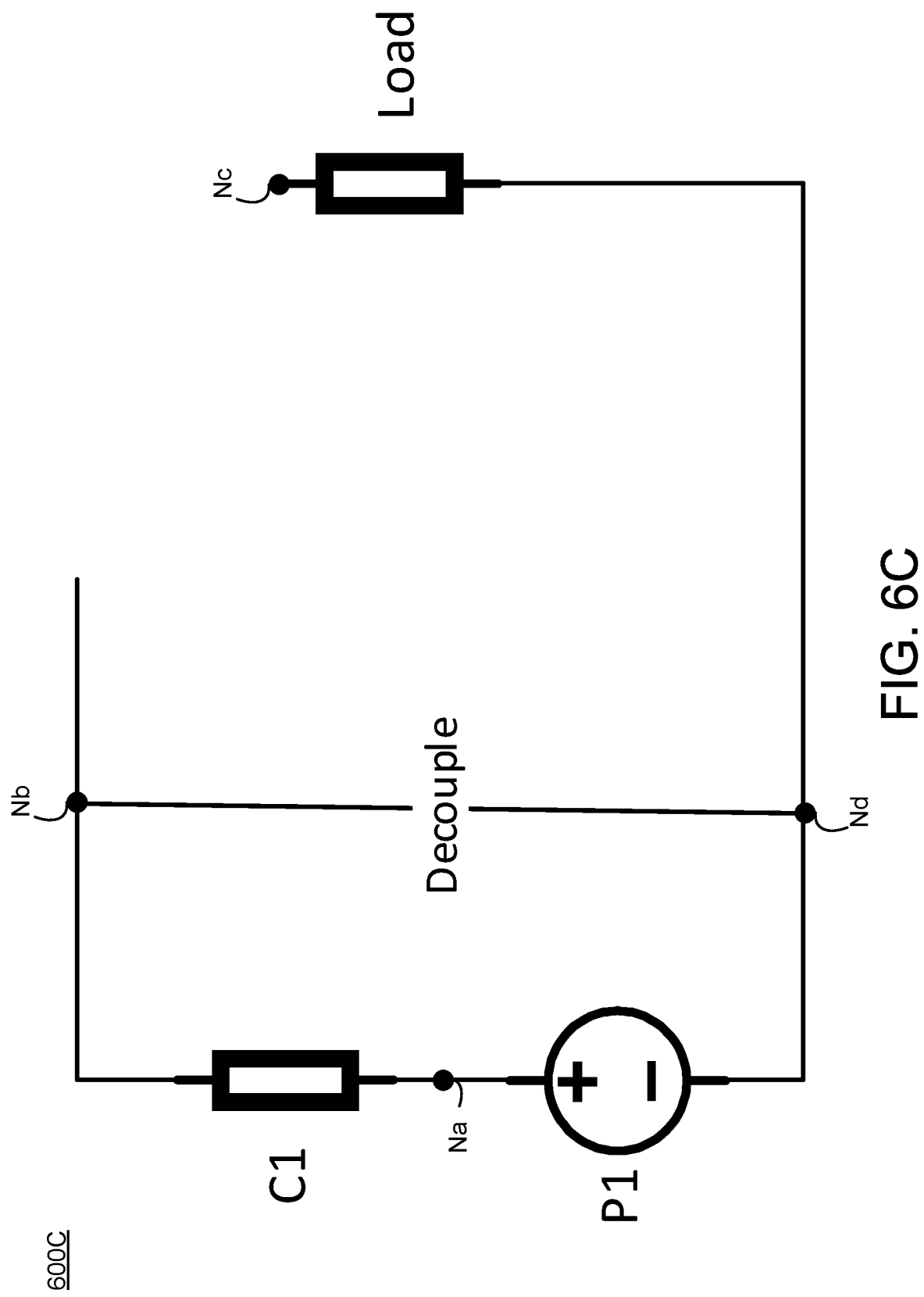
FIG. 6C illustrates an example schematic representation of the HVAC system with another device removed from the schematic representation shown in FIG. 6A for performing stranded node analysis, according to some embodiments.

Referring to FIG. 6A illustrated is an example schematic representation 600A of an HVAC system, according to some embodiments. FIG. 6B illustrates an example schematic representation 600B of the HVAC system with a primary pump P1 removed from the schematic representation shown in FIG. 6A for performing stranded node analysis, according to some embodiments. FIG. 6C illustrates an example schematic representation 600C of the HVAC system with a second pump P2 removed from the schematic representation shown in FIG. 6A for performing stranded node analysis, according to some embodiments. Through a stranded node analysis, the low level optimizer 450 may determine whether an HVAC device is a primary device or a secondary device. Distinguishing between the primary device or the secondary device may be critical during equipment selection. Lack of information on whether a pump subsystem feeds the load or a chiller subsystem may complicate the process. To distinguish between the primary pump P1 and the secondary pump P2, simply removing the device from the incidence matrix enables identification of the equipment with which the device is associated. For example, removal of primary pump P1 will uncover a stranded node Na between the pump P1 and chiller C1, which will establish the association or dependencies between the pump P1 and chiller C1 as shown in FIG. 6B. However, removal of secondary pump P2 will not result in any of the nodes Nb, Nc, Nd becoming stranded, because of the decouple line that allows a flow of gas or liquid through the secondary pump P2 to bypass the chiller C1 and the pump P1, meaning there will be no association or dependencies between the pump P2 and chiller C1.

Figure 7A:
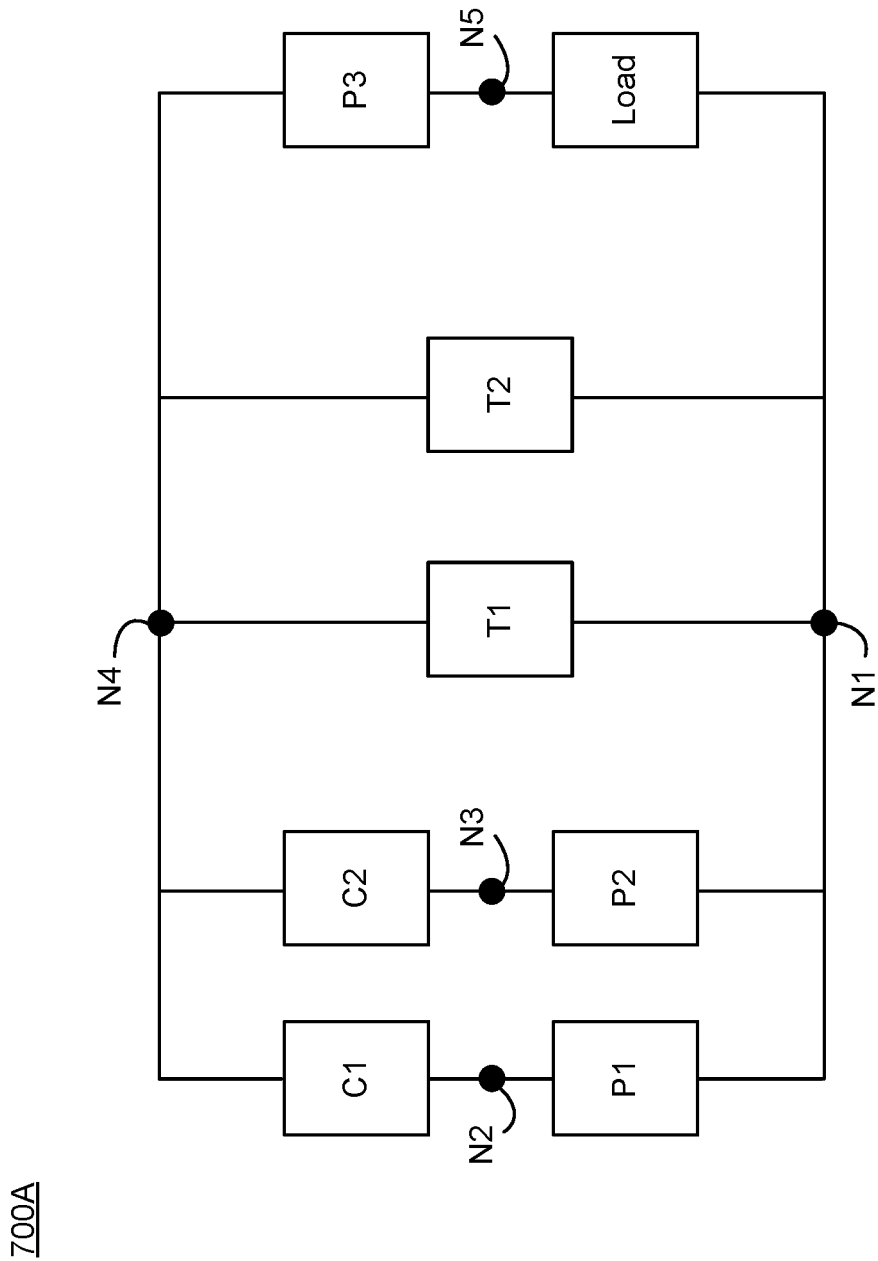
FIG. 7A is an example schematic representation of an HVAC system, according to some embodiments.

Referring to FIG. 7A, illustrated is an example schematic representation 700A of an HVAC system, according to some embodiments. Referring to FIG. 8A, illustrated is an example incidence matrix 800A of the HVAC system representing schematic connections of the HVAC system of FIG. 7A, according to some embodiments. In one example, C1 represents the Office of Statewide Health Planning and Development (OSHPD) chiller plant, with P1 being its primary pump, C2 represents the heat recovery chiller (HRC) Chiller Plant, with P2 being its primary pump, and P3 represents the secondary pump. If the high level optimizer 440 indicates that the OSHPD plant is to be disabled, the low level optimizer 450 may remove the OSHPD plant from the incidence matrix 800B, as shown below in FIG. 7B or FIG. 8B. For example, the value '-1' in an element 810 is substituted by '0', and the value '1' in an element 815 is substituted by '0'.

Figure 7B:
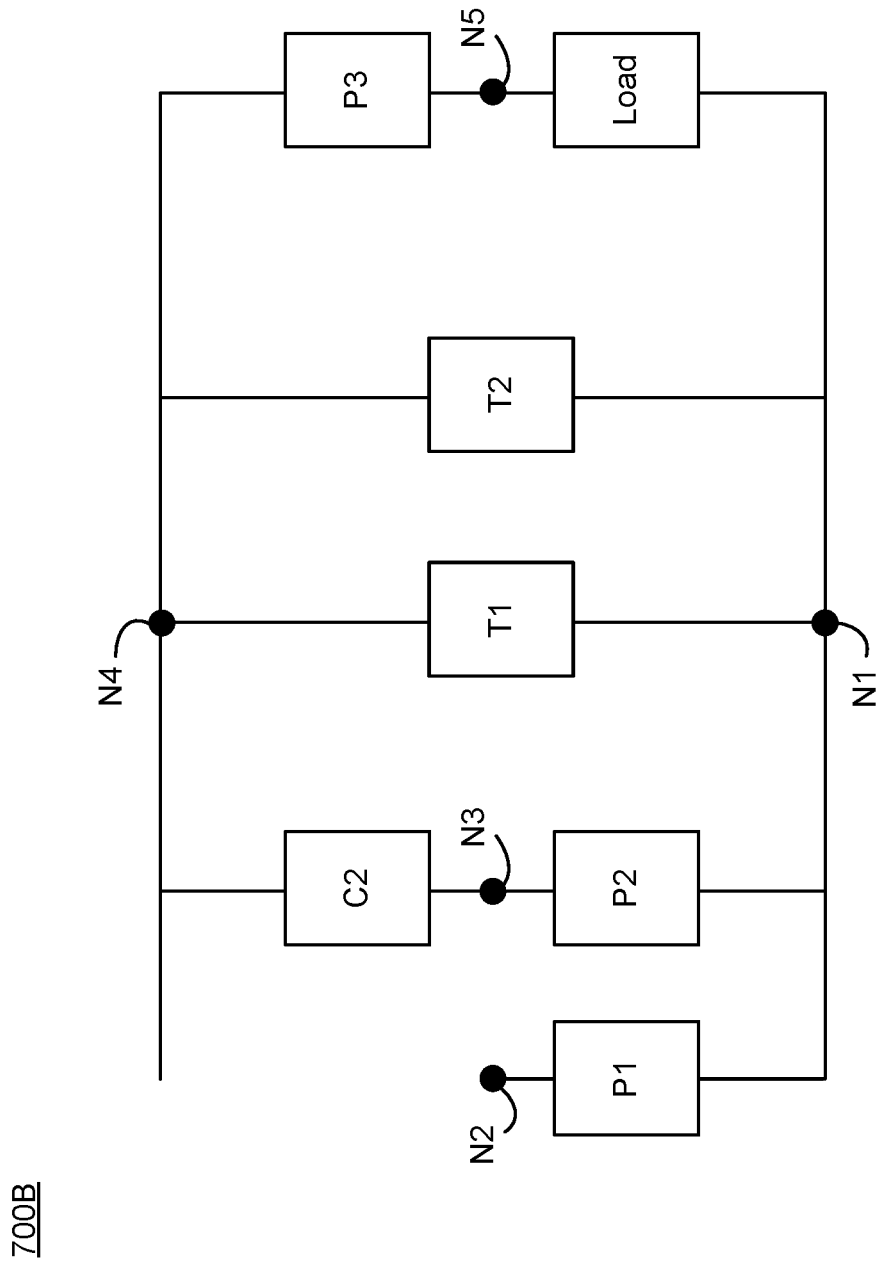
FIG. 7B is an example schematic representation of the HVAC system with a device removed from the schematic representation shown in FIG. 7A, according to some embodiments.

Referring to FIG. 7B, illustrated is an example schematic representation 700B of the HVAC system with a device removed from the schematic representation shown in FIG. 7A, according to some embodiments. Referring to FIG. 8B, illustrated is an example incidence matrix 800B of the HVAC system representing schematic connections of the HVAC system of FIG. 7B, according to some embodiments. Removal of C1 leaves the P1 connected to a stranded node N2, meaning P1 can also be removed. The node N4 connected to C2 is not left stranded, as there are still inlets (C2 and the Tank), and outlets (P3 and the Tank). In one approach, a column 820 of the incidence matrix having a value '1' or '-1' but not having a pair of '1' and '-1' is detected. Such column 820 represents a stranded node. Node N4 is not a stranded node, because column 825 has at least a pair of '-1' and '1'. If a stranded node is detected, a row 830 containing a nonzero value of the detected column 820 is detected. Such row 830 corresponds to a HVAC device P1 schematically dependent on the removed HVAC device C1.

Figure 7C:
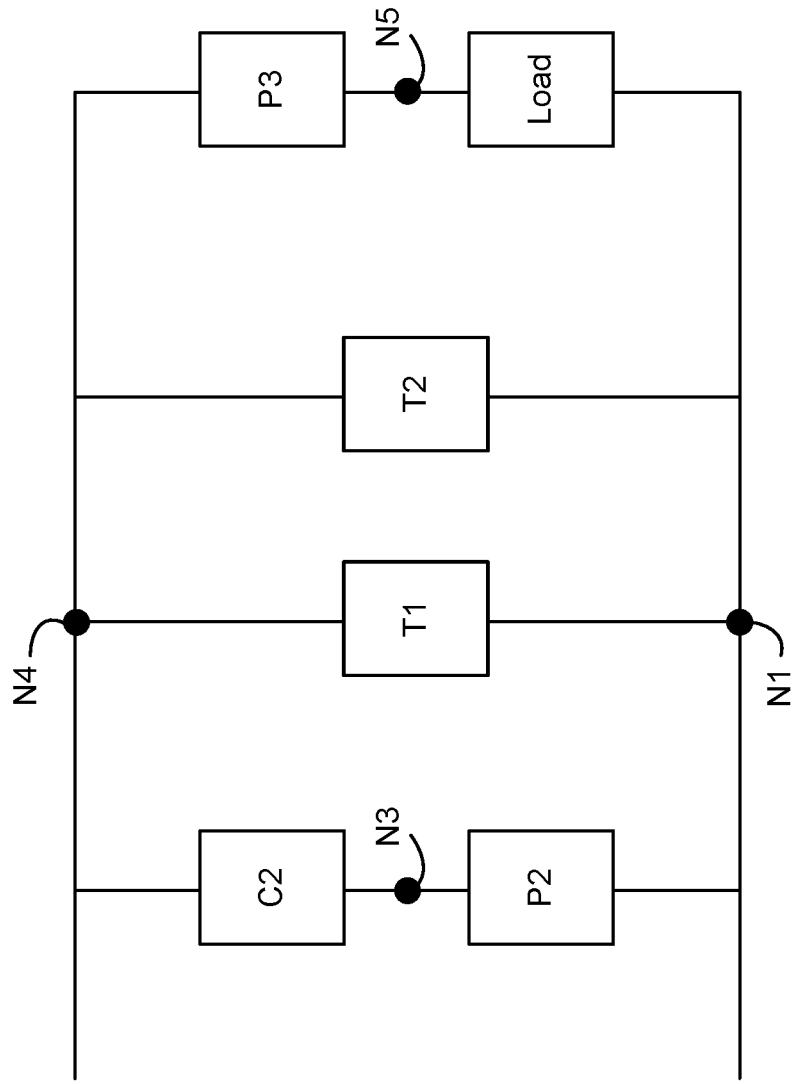
FIG. 7C is an example schematic representation of the HVAC system after removing another device dependent on the removed device of FIG. 7B, according to some embodiments.

Referring to FIG. 7C, illustrated is an example schematic representation 700C of the HVAC system after removing another device dependent on the removed device of FIG. 7B, according to some embodiments. Referring to FIG. 8C, illustrated is an example incidence matrix 800C of the HVAC system representing schematic connections of the HVAC system of FIG. 7C, according to some embodiments. After removing P1, the simplified schematic representation of HVAC system can be obtained as shown in FIG. 7C or FIG. 8C. For example, the value '-1' in an element 840 is substituted by '0', and the value '1' in an element 845 is substituted by '0'.

Figure 9:
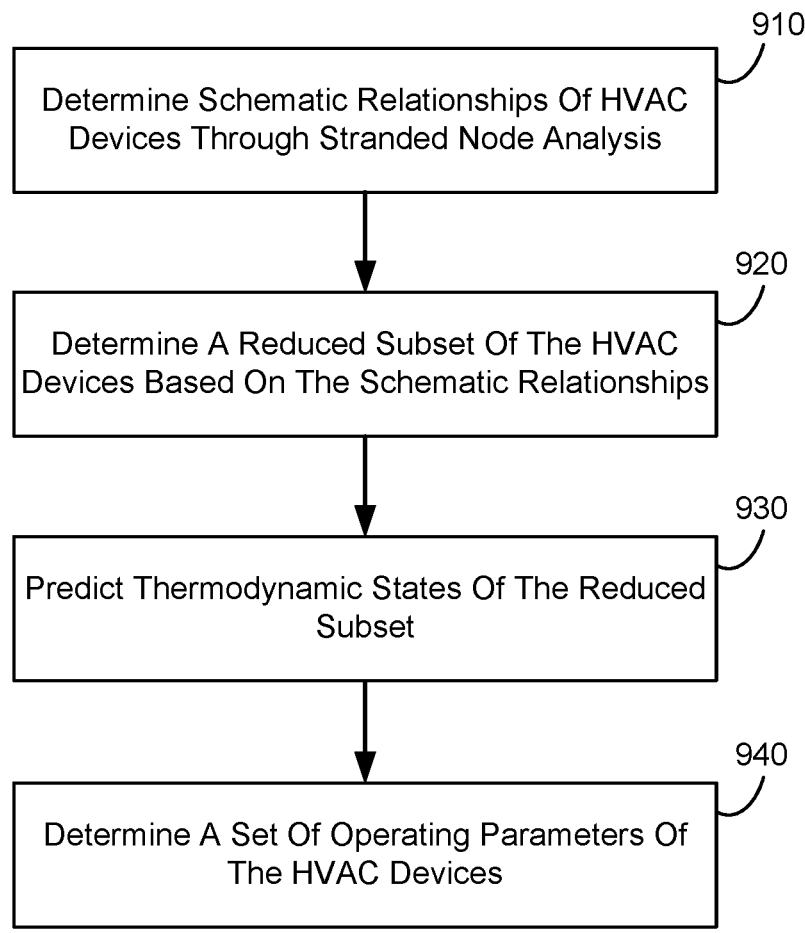
FIG. 9 is a flow chart illustrating a process of determining a set of operating parameters of HVAC devices through a stranded node analysis, according to some embodiments.

FIG. 9 is a flow chart illustrating a process 900 of determining a set of operating parameters of HVAC devices through a stranded node analysis, according to some embodiments. The process 900 may be performed by the low level optimizer 450 of FIG. 4. In some embodiments, the process 900 may be performed by other entities. In some embodiments, the process 900 may include additional, fewer, or different steps than shown in FIG. 9.

The low level optimizer 450 determines schematic relationships of HVAC devices through a stranded node analysis (step 910). The low level optimizer 450 may obtain plant netlist data representing schematic connections of HVAC devices, and generate an incidence matrix according to the plant netlist data. The low level optimizer 450 may replace nonzero values of a row of the incidence matrix with zero, then identify whether a stranded node exists by detecting whether a column of the incidence matrix has a nonzero value but not a pair of '-1' and '1'. Another row of the incidence matrix having the nonzero value of the column is detected. A HVAC device associated with the another row is determined to be dependent on a HVAC device associated with the row.

The low level optimizer 450 determines a reduced subset of the HVAC devices based on the schematic relationships (step 920). In one approach, the low level optimizer 450 determines which device is to be enabled or disabled based on the Q allocation data 442. For example, if no load is assigned to a device, the low level optimizer 450 determines that the device is disabled or turned off. For another example, if any load is assigned to a device, the low level optimizer 450 determines that the device is enabled or turned on. The low level optimizer 450 may generate a subset of HVAC devices, of which thermodynamic states to be determined. The low level optimizer 450 may identify a device to be disabled and exclude HVAC devices that are schematically dependent on the disabled device from the list. Similarly, the low level optimizer 450 may identify a device to be enabled and include HVAC devices that are schematically dependent on an enabled device to the list.

The low level optimizer 450 predicts thermodynamic states of the reduced subset (step 930), and determines a set of operating parameters of the HVAC device (step 940). The controller 410 may operate HVAC devices according to the determined set of operating parameters.

Figure 10:
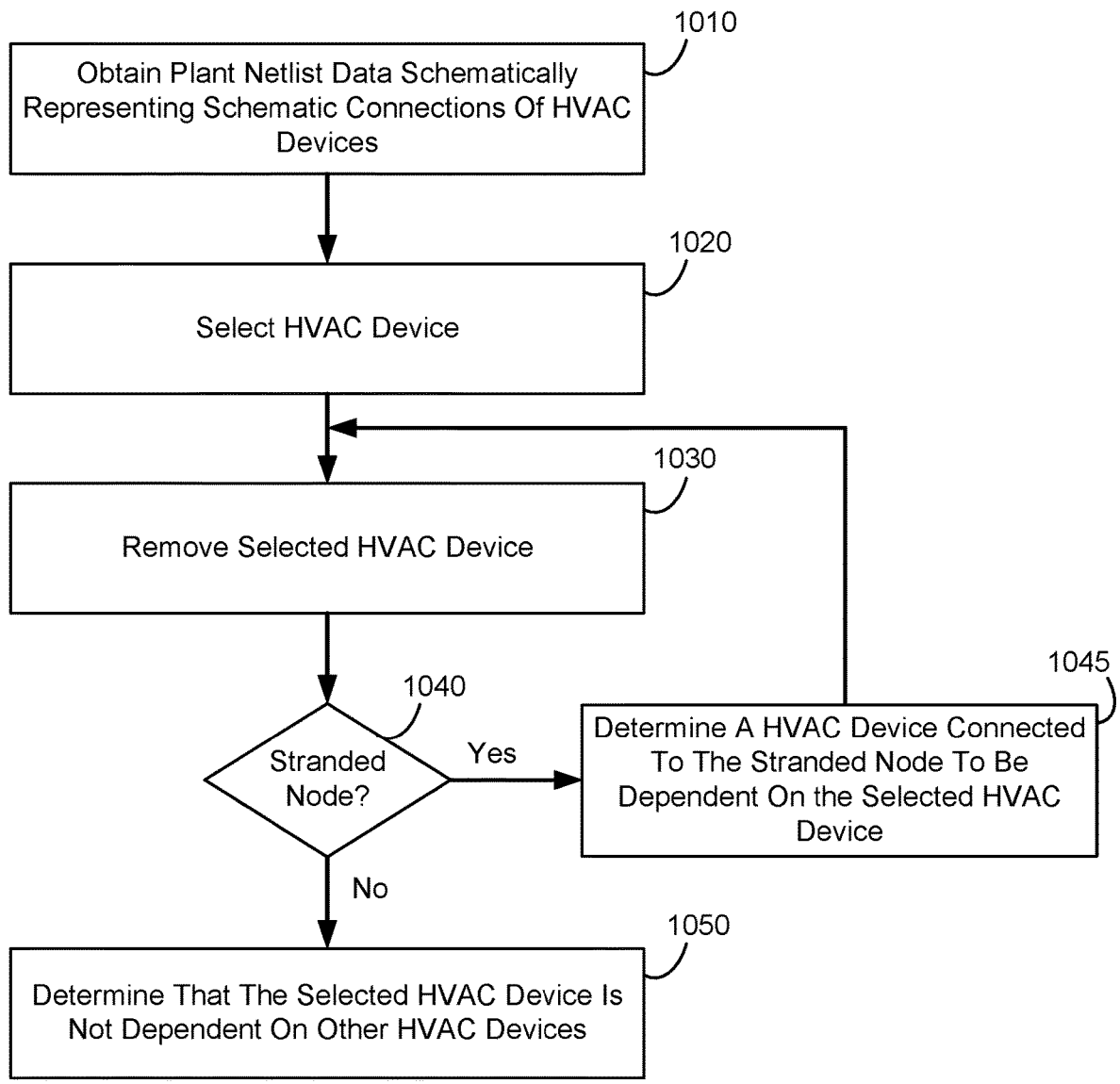
FIG. 10 is a flow chart illustrating a process of performing a stranded node analysis, according to some embodiments.

FIG. 10 is a flow chart illustrating a process 1000 of performing a stranded node analysis, according to some embodiments. The process 1000 may be performed by the stranded node analyzer 502 of FIG. 5. In some embodiments, the process 1000 may be performed by other entities. In some embodiments, the process 1000 may include additional, fewer, or different steps than shown in FIG. 10.

The stranded node analyzer 502 obtains plant netlist data schematically representing schematic connections of HVAC devices of a HVAC system (step 1010). The plant netlist data may be automatically generated based on a graphical user interface allowing a user to schematically define connections of the plurality of HVAC devices. Alternatively, the plant netlist data may be manually entered by a user through a text editor.

The stranded node analyzer 502 selects a HVAC device from a plurality of HVAC devices in the HVAC system (step 1020). The HVAC device may be randomly selected or selected according to a user instruction. The stranded node analyzer 502 removes the selected HVAC device from the plant netlist data (step 1030), and determines whether any stranded node exists after the removing the selected HVAC device (step 1040). If a stranded node having either an inlet or an outlet but not having a pair of inlet and outlet exists, then the stranded node analyzer 502 determines that, from the remaining HVAC devices, HVAC device connected to the stranded node is dependent on the selected HVAC device (step 1045). The stranded node analyzer 502 may select the dependent HVAC device, and return to step 1030. If no stranded node is detected, then the stranded node analyzer 502 determines that the selected HVAC device is not dependent on other HVAC devices (step 1050). The stranded node analyzer 502 may select another HVAC device and return to step 1030. If all HVAC devices have been examined, the stranded node analyzer 502 may generate a look up table indicating dependencies of the HVAC devices.

Basic Control System Using Graph Theory

Figure 11A:
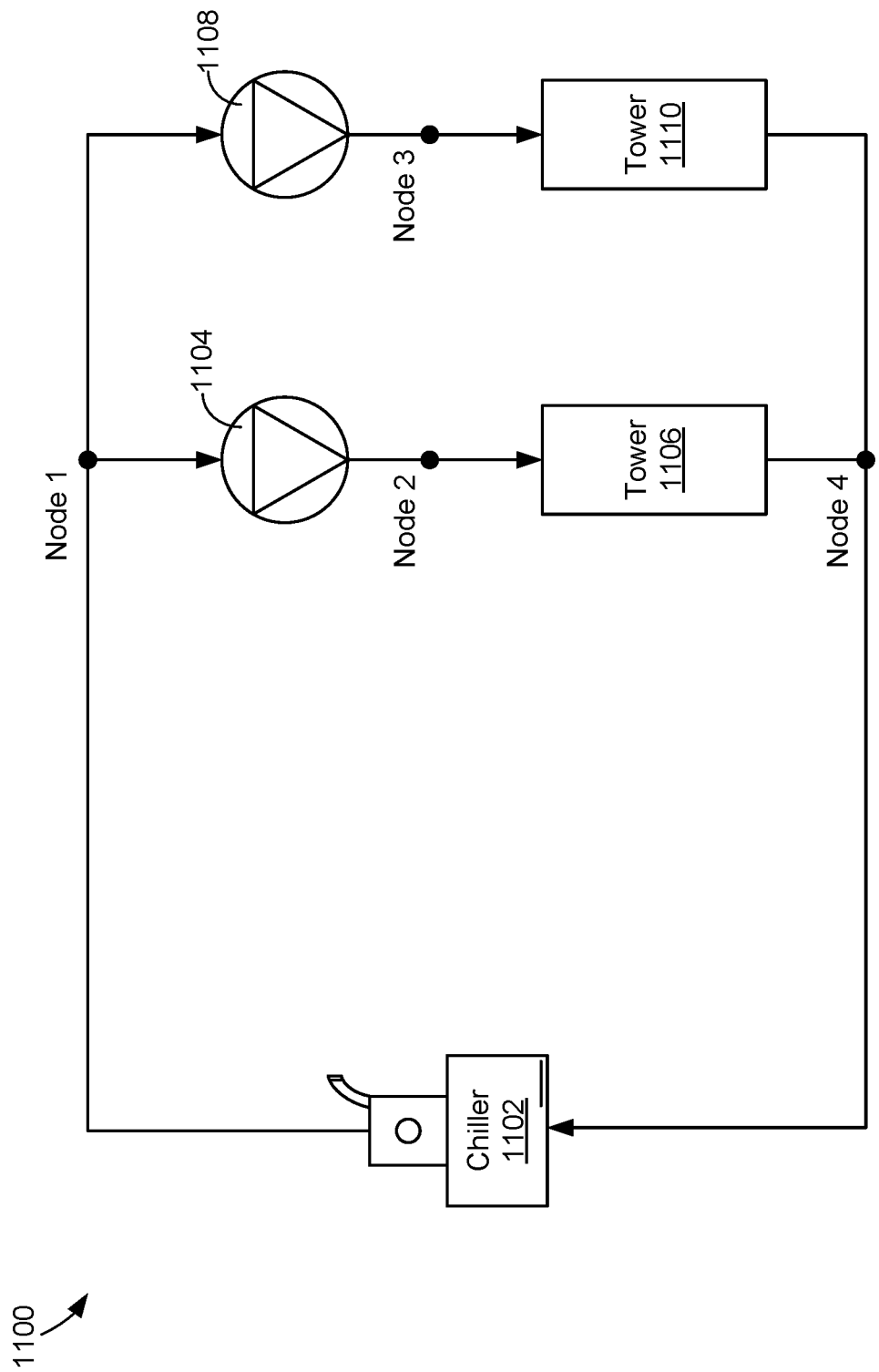
FIG. 11A is a schematic representation of an chiller system which can be part of the HVAC system of FIG. 1, according to some embodiments.

Referring now to FIG. 11A, another example schematic representation of a chiller system 1100 is shown, according to some embodiments. Chiller system 1100 can be incorporated in any of the systems described above, such as HVAC system 100 and/or BMS system 400. Chiller system 1100 is shown to include chiller 1102, pump 1104, tower 1106, pump 1108, and tower 1110. Low-level optimizer 450 ("optimizer 450") may be configured to determine and/or receive the schematic representation of systems and/or subsystems within HVAC system 100, such as chiller system 1100.

While FIG. 11A shows an embodiment of a chiller system, various other systems and the devices thereof within buildings can be considered, such as boiler systems, airside systems (e.g., VAV box subsystems, etc.), natural gas flow systems, electrical networks, or any combination thereof. Although the systems and methods of the present disclosure are described primarily with respect to a chiller plant, the same systems and methods can be applied to any type of system. The only requirement is that the network of devices need to be connected to each other in some fashion and they need to transmit some type of resource among themselves. That resource can be a water in a chiller system or water/steam boiler system, air in an airside system, electricity in an electrical system, etc.

System 1100 is also shown to include several nodes: node 1 connecting chiller 1102, pump 1104, and pump 1108, node 2 connecting pump 1104 and tower 1106, node 3 connecting pump 1108 and tower 1110, and node 4 connecting chiller 1102, tower 1106, and 1110. As referred to herein, the "nodes" may include the connections between the one or more HVAC devices in the system and the "edges" may include the one or more devices that connect to other devices via the nodes. Nodes may act as a medium to transfer resources between two edges (i.e., devices in the system). As an example, a node in a fluid flow system may be a fluid conduit (e.g., a pipe) that moves fluid from one device to another. In another example, a node in an airflow system may be an air duct that moves the air from one device to another. In another example, a node in an electrical system can be wires/cables that facilitate the transmission of electricity within the circuit. As shown in FIG. 11A, pump 1104 (edge) and tower 1106 (edge) are connected by node 2. Specifically, pump 1104 supplies node 2 (e.g., provides a fluid or other resource to tower 1106 via node 2) while tower 1106 is supplied by node 2 (e.g., receives a fluid or other resource from pump 1104 via node 2).

While the schematic relationships disclosed herein describe the nodes representing the connections between the devices and the edges representing the devices in the system, the inverse representation is also considered and could be implemented. In such embodiments, the nodes represent devices and the edges represent connections between the devices, in which case the nodes (devices) would be supplied by edges (conduits providing flow of a resource into the node) and provide output to other edges (conduits receiving flow of a resource out of the node).

Optimizer 450 may generate an MxN incidence matrix where M is the number of equipment (i.e., edges) in chiller system 1100 and N is the number of nodes in chiller system 1100. As shown in FIG. 11A, system 1100 has 5 pieces of equipment and 4 nodes, resulting in an incidence matrix (A) of a 5×4 matrix. In some embodiments, the incidence matrix can represent nodal connections by using a "1" to indicate flow into a node, using a "−1" to indicate flow out of a node, and a "0" to indicate that the equipment is not relating to the node. As mentioned above, the equipment is referred to as an edge, the point at which edges join can be referred to as a node. An exemplary incidence matrix representing the topography of system 1100 is shown below:

$$A = \begin{bmatrix} -1 & 1 & 0 & 0 \\ -1 & 0 & 1 & 0 \\ 0 & -1 & 0 & 1 \\ 0 & 0 & -1 & 1 \\ 1 & 0 & 0 & -1 \end{bmatrix} \quad \text{Eq. (5)}$$

In the above example, the first row represents the nodal connections for pump 1104, the second row represents nodal connections for pump 1108, the third row represents nodal connections for tower 1106, the fourth row represents nodal connections for tower 1110, and the fifth row represents nodal connections for chiller 1102. Additionally, the first, second, third, and fourth columns (from left to right) represent nodal connections of the first node, second node, third node, and fourth node, respectively. As such, Eq. 5 shows that pump 1104 is sourced by node 1 and supplies to node 2, pump 1108 is sourced by node 1 and supplies to node 3, tower 1106 is sourced by node 2 and supplies to node 4, tower 1110 is sourced by node 3 and supplies to node 4, and chiller 1102 is sourced by node 4 and supplies to node 1.

As an overview, in some embodiments, a Laplacian Matrix, L, of the incidence matrix, A, may be used to determine the degrees matrix, D, to indicate how many edges are connected to each node. The equation for determining the Laplacian Matrix, L, is shown below:

$$L = A^T A \quad \text{Eq. (6)}$$

As shown in Eq. 6, the transpose of A is multiplied by A to determine L. This calculation is shown below:

$$A = \begin{bmatrix} -1 & 1 & 0 & 0 \\ -1 & 0 & 1 & 0 \\ 0 & -1 & 0 & 1 \\ 0 & 0 & -1 & 1 \\ 1 & 0 & 0 & -1 \end{bmatrix}, A^T = \begin{bmatrix} -1 & -1 & 0 & 0 & 1 \\ 1 & 0 & -1 & 0 & 0 \\ 0 & 1 & 0 & -1 & 0 \\ 0 & 0 & 1 & 1 & -1 \end{bmatrix} \quad \text{Eq. (7)}$$

$$L =$$

$$A^T A = \begin{bmatrix} -1 & -1 & 0 & 0 & 1 \\ 1 & 0 & -1 & 0 & 0 \\ 0 & 1 & 0 & -1 & 0 \\ 0 & 0 & 1 & 1 & -1 \end{bmatrix} * \begin{bmatrix} -1 & 1 & 0 & 0 \\ -1 & 0 & 1 & 0 \\ 0 & -1 & 0 & 1 \\ 0 & 0 & -1 & 1 \\ 1 & 0 & 0 & -1 \end{bmatrix} = \begin{bmatrix} 3 & -1 & -1 & -1 \\ -1 & 2 & 0 & -1 \\ -1 & 0 & 2 & -1 \\ -1 & -1 & -1 & 3 \end{bmatrix}$$

$$D = \text{diag}(L) = \text{diag}\left(\begin{bmatrix} 3 & -1 & -1 & -1 \\ -1 & 2 & 0 & -1 \\ -1 & 0 & 2 & -1 \\ -1 & -1 & -1 & 3 \end{bmatrix}\right) = \begin{bmatrix} 3 & 0 & 0 & 0 \\ 0 & 2 & 0 & 0 \\ 0 & 0 & 2 & 0 \\ 0 & 0 & -1 & 3 \end{bmatrix}$$

$$\therefore L = \begin{bmatrix} 3 & -1 & -1 & -1 \\ -1 & 2 & 0 & -1 \\ -1 & 0 & 2 & -1 \\ -1 & -1 & -1 & 3 \end{bmatrix}$$

While the main diagonal of the L matrix determines the D matrix (with "0" in all matrix elements apart from the main diagonal), the upper and lower triangular matrices, when separated from the main diagonal, determine the adjacency matrix, W, and can indicate when nodes are connected by an edge, according to some embodiments. Determining the W matrix is shown below:

$$W = \text{triangular}(L) =$$  Eq. (8)

$$\text{triangular}\left(\begin{bmatrix} 3 & -1 & -1 & -1 \\ -1 & 2 & 0 & -1 \\ -1 & 0 & 2 & -1 \\ -1 & -1 & -1 & 3 \end{bmatrix}\right) = \begin{bmatrix} 0 & -1 & -1 & -1 \\ -1 & 0 & 0 & -1 \\ -1 & 0 & 0 & -1 \\ -1 & -1 & -1 & 0 \end{bmatrix}$$

$$\therefore D = \begin{bmatrix} 3 & 0 & 0 & 0 \\ 0 & 2 & 0 & 0 \\ 0 & 0 & 2 & 0 \\ 0 & 0 & 0 & 3 \end{bmatrix}, W = \begin{bmatrix} 0 & -1 & -1 & -1 \\ -1 & 0 & 0 & -1 \\ -1 & 0 & 0 & -1 \\ -1 & -1 & -1 & 0 \end{bmatrix}$$  Eq. (9)

Input/Output-Specific Elements for Basic System

As discussed above, optimizer 450 may generate an incidence matrix, referred to herein as the "A" matrix, in some embodiments. The A matrix may relate the nodes in a system to the equipment in the system. For example, in system 1100, the A matrix is determined to be:

$$A = \begin{bmatrix} -1 & 1 & 0 & 0 \\ -1 & 0 & 1 & 0 \\ 0 & -1 & 0 & 1 \\ 0 & 0 & -1 & 1 \\ 1 & 0 & 0 & -1 \end{bmatrix}$$

Where the rows (M) represent the pieces of equipment and the columns (N) represent the nodes in system 1100, and where a "1" is used to indicate flow into a node, a "−1" is used to indicate flow out of a node, and a "0" is used to indicate that the equipment is not relating to the node.

Using graph theory and matrix algebra, the incidence matrix A can be used to determine several different aspects of the topography of a system, according to some embodiments. In addition to these aspects described above, the incidence matrix A can also be separated into input and output elements $A_{in}$ and $A_{out}$. These $A_{in}$ and $A_{out}$ matrices may be used to calculate, $D_{in}$ and $D_{out}$, which can indicate the number of upstream edges supplying a node and the number of downstream edges sourced by a node, respectively. After generating the incidence matrix exclusively for edges that are sourced by nodes, $A_{in}$, and the incidence matrix exclusively for edges that provide output to nodes, $A_{out}$, the corresponding diagonal matrices $D_{in}$ and $D_{out}$ can be determined using a process similar to the process for determining the degrees matrix for A. $A_{in}$ and $A_{out}$ can be calculated using the following equations:

$$\therefore A_{in} = \frac{(A + \text{abs}(A))}{2},$$  Eq. (10)

$$A_{out} = A_{in} - A$$  Eq. (11)

Specifically, Eq. 10 states that the $A_{in}$ matrix is determined by adding the A matrix and the absolute value of the A matrix, and dividing the sum by two. $A_{out}$ is determined by subtracting the A matrix from the determined $A_{in}$ matrix. Continuing with the above example, $A_{in}$ and $A_{out}$ can be calculated to be:

$$A_{in} = \frac{(A + \text{abs}(A))}{2} = \left(\frac{1}{2}\right) * \left(\begin{bmatrix} -1 & 1 & 0 & 0 \\ -1 & 0 & 1 & 0 \\ 0 & -1 & 0 & 1 \\ 0 & 0 & -1 & 1 \\ 1 & 0 & 0 & -1 \end{bmatrix} + \begin{bmatrix} -1 & 1 & 0 & 0 \\ -1 & 0 & 1 & 0 \\ 0 & -1 & 0 & 1 \\ 0 & 0 & -1 & 1 \\ 1 & 0 & 0 & -1 \end{bmatrix}\right) =$$

$$\left(\frac{1}{2}\right) * \left(\begin{bmatrix} -1 & 1 & 0 & 0 \\ -1 & 0 & 1 & 0 \\ 0 & -1 & 0 & 1 \\ 0 & 0 & -1 & 1 \\ 1 & 0 & 0 & -1 \end{bmatrix} + \begin{bmatrix} 1 & 1 & 0 & 0 \\ 1 & 0 & 1 & 0 \\ 0 & 1 & 0 & 1 \\ 0 & 0 & 1 & 1 \\ 1 & 0 & 0 & 1 \end{bmatrix}\right) = \begin{bmatrix} 0 & 1 & 0 & 0 \\ 0 & 0 & 1 & 0 \\ 0 & 0 & 0 & 1 \\ 0 & 0 & 0 & 1 \\ 1 & 0 & 0 & 0 \end{bmatrix} A_{out} = A_{in} - A =$$

$$\begin{bmatrix} 0 & 1 & 0 & 0 \\ 0 & 0 & 1 & 0 \\ 0 & 0 & 0 & 1 \\ 0 & 0 & 0 & 1 \\ 1 & 0 & 0 & 0 \end{bmatrix} - \begin{bmatrix} -1 & 1 & 0 & 0 \\ -1 & 0 & 1 & 0 \\ 0 & -1 & 0 & 1 \\ 0 & 0 & -1 & 1 \\ 1 & 0 & 0 & -1 \end{bmatrix} = \begin{bmatrix} -1 & 0 & 0 & 0 \\ -1 & 0 & 0 & 0 \\ 0 & -1 & 0 & 0 \\ 0 & 0 & -1 & 0 \\ 0 & 0 & 0 & -1 \end{bmatrix} \therefore A_{in} =$$

$$\begin{bmatrix} 0 & 1 & 0 & 0 \\ 0 & 0 & 1 & 0 \\ 0 & 0 & 0 & 1 \\ 0 & 0 & 0 & 1 \\ 1 & 0 & 0 & 0 \end{bmatrix}, A_{out} = \begin{bmatrix} -1 & 0 & 0 & 0 \\ -1 & 0 & 0 & 0 \\ 0 & -1 & 0 & 0 \\ 0 & 0 & -1 & 0 \\ 0 & 0 & 0 & -1 \end{bmatrix}$$

The transpose of $A_{in}$ can be multiplied by $A_{in}$ to determine $L_{in}$, similar to how the transpose of A is multiplied by A to determine L (see Eq. 6 above for reference). Additionally, the transpose of $A_{out}$ can be multiplied by $A_{out}$ to determine $L_{out}$. These calculations are shown below. First, the transpose of $A_{in}$ and transpose of $A_{out}$ are determined:

$$A_{in} = \begin{bmatrix} 0 & 1 & 0 & 0 \\ 0 & 0 & 1 & 0 \\ 0 & 0 & 0 & 1 \\ 0 & 0 & 0 & 1 \\ 1 & 0 & 0 & 0 \end{bmatrix}, A_{in}^T = \begin{bmatrix} 0 & 0 & 0 & 0 & 1 \\ 1 & 0 & 0 & 0 & 0 \\ 0 & 1 & 0 & 0 & 0 \\ 0 & 0 & 1 & 1 & 0 \end{bmatrix}$$

$$A_{out} = \begin{bmatrix} -1 & 0 & 0 & 0 \\ -1 & 0 & 0 & 0 \\ 0 & -1 & 0 & 0 \\ 0 & 0 & -1 & 0 \\ 0 & 0 & 0 & -1 \end{bmatrix}, A_{out}^T = \begin{bmatrix} -1 & -1 & 0 & 0 & 0 \\ 0 & 0 & -1 & 0 & 0 \\ 0 & 0 & 0 & -1 & 0 \\ 0 & 0 & 0 & 0 & -1 \end{bmatrix}$$

Then, $D_{in}$ and $D_{in}$ are calculated by taking the diagonals of $L_{in}$ and $L_{out}$, respectively:

Eq. (12)

$$D_{in} = \text{diag}(L_{in}) =$$

$$\text{diag}(A_{in}^T * A) = \text{diag}\left(\begin{bmatrix} 0 & 0 & 0 & 0 & 1 \\ 1 & 0 & 0 & 0 & 0 \\ 0 & 1 & 0 & 0 & 0 \\ 0 & 0 & 1 & 1 & 0 \end{bmatrix} * \begin{bmatrix} -1 & 1 & 0 & 0 \\ -1 & 0 & 1 & 0 \\ 0 & -1 & 0 & 1 \\ 0 & 0 & -1 & 1 \\ 1 & 0 & 0 & -1 \end{bmatrix}\right) =$$

$$\text{diag}\left(\begin{bmatrix} 1 & 0 & 0 & -1 \\ -1 & 1 & 0 & 0 \\ -1 & 0 & 1 & 0 \\ 0 & -1 & -1 & 2 \end{bmatrix}\right) = \begin{bmatrix} 1 & 0 & 0 & 0 \\ 0 & 1 & 0 & 0 \\ 0 & 0 & 1 & 0 \\ 0 & 0 & 0 & 2 \end{bmatrix}$$

Eq. (13)

$$D_{out} = \text{diag}(L_{out}) = \text{diag}(A_{out}^T * A) =$$

-continued $$\text{diag}\left(\begin{bmatrix} -1 & -1 & 0 & 0 & 0 \\ 0 & 0 & -1 & 0 & 0 \\ 0 & 0 & 0 & -1 & 0 \\ 0 & 0 & 0 & 0 & -1 \end{bmatrix} * \begin{bmatrix} -1 & 1 & 0 & 0 \\ -1 & 0 & 1 & 0 \\ 0 & -1 & 0 & 1 \\ 0 & 0 & -1 & 1 \\ 1 & 0 & 0 & -1 \end{bmatrix}\right) =$$

$$\text{diag}\left(\begin{bmatrix} 2 & -1 & -1 & 0 \\ 0 & 1 & 0 & -1 \\ 0 & 0 & 1 & -1 \\ -1 & 0 & 0 & 1 \end{bmatrix}\right) = \begin{bmatrix} 2 & 0 & 0 & 0 \\ 0 & 1 & 0 & 0 \\ 0 & 0 & 1 & 0 \\ 0 & 0 & 0 & 1 \end{bmatrix}$$

$$\therefore D_{in} = \begin{bmatrix} 1 & 0 & 0 & 0 \\ 0 & 1 & 0 & 0 \\ 0 & 0 & 1 & 0 \\ 0 & 0 & 0 & 2 \end{bmatrix}, D_{out} = \begin{bmatrix} 2 & 0 & 0 & 0 \\ 0 & 1 & 0 & 0 \\ 0 & 0 & 1 & 0 \\ 0 & 0 & 0 & 1 \end{bmatrix} \quad \text{Eq. (14)}$$

System Example and Analysis

The diagonal lines of $D_{in}$ may indicate the number of upstream edges supplied by that node. For example, the top-left element in the $D_{in}$ matrix in Eq. 11 is "1," which indicates that there is one device supplying node 1 (e.g., providing one or more resources to other edges or devices via node 1, etc.).

Following this logic, it can be determined that one device (pump 1104) is supplying node 2, one device (pump 1108) is supplying node 3, and two devices (tower 1106 and tower 1110) are supplying node 4. Similarly, the diagonal lines of $D_{out}$ may indicate the number of downstream edges sourced by that node. $D_{out}$ indicates that there are two devices (pump 1104 and pump 1108) sourced by node 1 (e.g., receiving resources from another device via node 1, etc.), one device (tower 1106) sourced by node 2, one device (tower 1110) sourced by node 3, and one device (chiller 1102) sourced by node 4.

If one or more of the matrix elements in the diagonal lines of $D_{in}$ or $D_{out}$ are "0" this can be indicative of an open circuit where no device is supplied by the node or no device is sourced by the node, respectively. Therefore, in some embodiments, the row of A for that node can be multiplied by zero to remove that node from the network and/or the schematic representation. Optimizer 450 can then operate with the reduced subset of the schematic with the open circuit nodes removed from the network. An exemplary embodiment of the process occurring is shown below with reference to FIG. 11B.

Figure 11B:
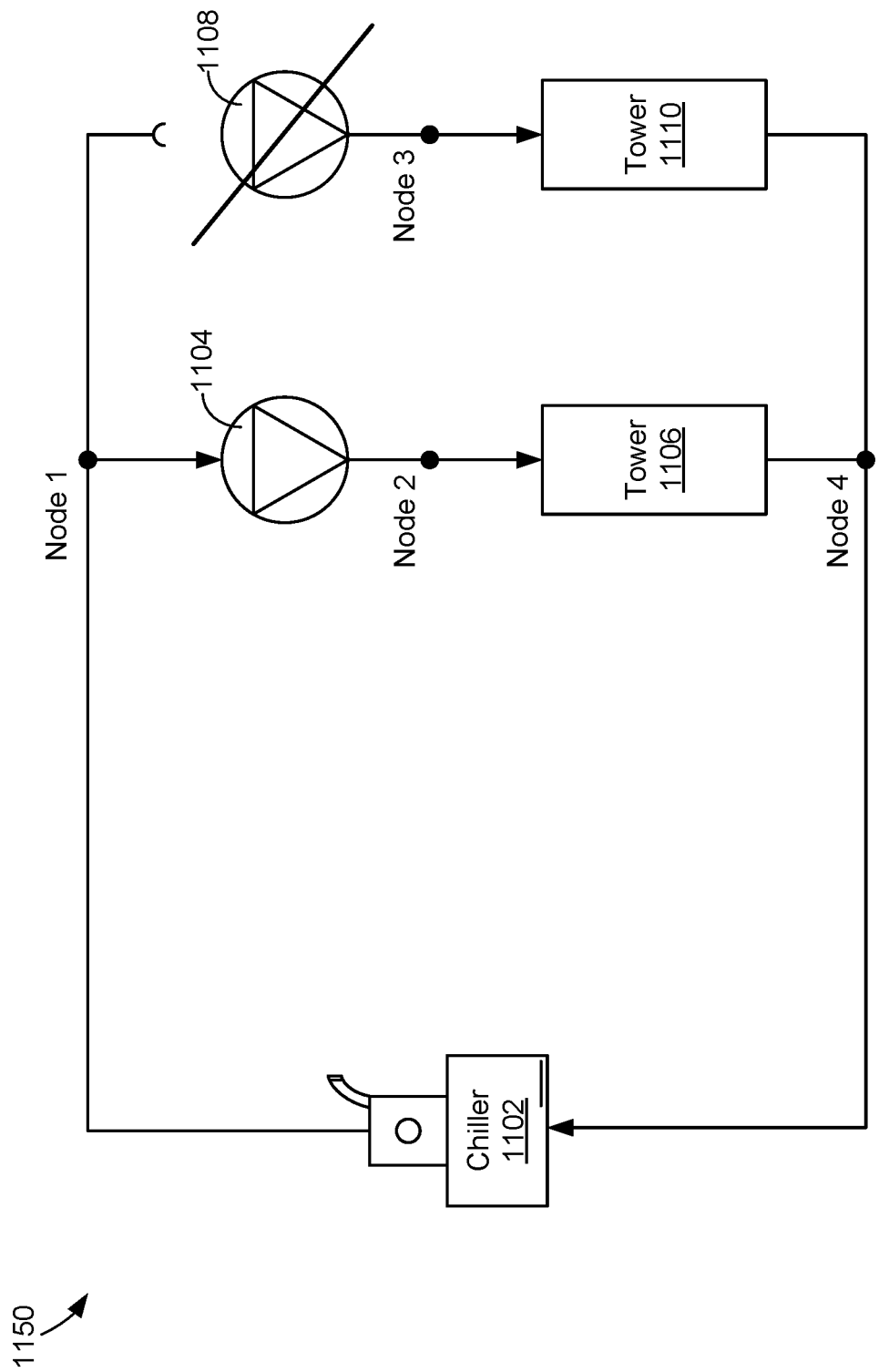
FIG. 11B is a schematic representation of a chiller system with an unavailable device, which can be part of the HVAC system of FIG. 1, according to some embodiments.

Referring now to FIGS. 11B-C schematic representations of system 1100 throughout the process of removing devices connected to open circuit nodes are shown, according to some embodiments. Particularly, system 1150 in FIG. 11B shows optimizer 450 determining that pump 1108 is inoperable, while system 1160 in FIG. 11C shows optimizer 450 performing the graph theory analysis and matrix calculations described above to remove upstream or otherwise connected edges (i.e., devices) to the now-determined open circuit nodes.

In one example, optimizer 450 has a determined topography of the system 1100 as shown in FIG. 11A. Via obtaining sensor measurements from sensors proximate to pump 1108, optimizer 450 determines that pump 1108 is inoperable or is not operating as expected (e.g., pump failure, etc.). Optimizer updates an edge availability matrix that represents which devices are available and which devices are unavailable. In the above example, this could result in the following edge availability matrix:

$$\begin{bmatrix} 1 \\ 0 \\ 1 \\ 1 \\ 1 \end{bmatrix}$$

Where, similar to incidence matrix A for system 1100, the first row corresponds to pump 1104, the second row corresponds to pump 1108, the third row corresponds to tower 1106, the fourth row corresponds to tower 1110, and the firth row corresponds to chiller 1102. Based on the now-updated edge availability matrix, optimizer 450 has indicated that all devices in system 1100 except for pump 1108 are available.

Optimizer 450 can then remove the unavailable edges from the incidence matrix by multiplying the incidence matrix with the edge availability matrix. This is shown below:

$$A_E = \begin{bmatrix} 1 \\ 0 \\ 1 \\ 1 \\ 1 \end{bmatrix} \circ \begin{bmatrix} -1 & 1 & 0 & 0 \\ -1 & 0 & 1 & 0 \\ 0 & -1 & 0 & 1 \\ 0 & 0 & -1 & 1 \\ 1 & 0 & 0 & -1 \end{bmatrix} = \begin{bmatrix} -1 & 1 & 0 & 0 \\ 0 & 0 & 0 & 0 \\ 0 & -1 & 0 & 1 \\ 0 & 0 & -1 & 1 \\ 1 & 0 & 0 & -1 \end{bmatrix}$$

Where an element-wise product is found from multiplying the incidence matrix with the edge availability matrix. The element-wise product multiply each element in the row of the incidence matrix with the corresponding row of the edge availability matrix to produce an updated incidence matrix $A_E$.

Then, using the graph theory analysis and matrix calculations described above, optimizer 450 determines $D_{in}$ and $D_{out}$ based on the updated incidence matrix $A_E$. For example, using the updated incidence matrix $A_E$ the following calculations can be made:

$A_{in} =$ $$\frac{(A_E + \text{abs}(A_E))}{2} = \left(\frac{1}{2}\right) * \left(\begin{bmatrix} -1 & 1 & 0 & 0 \\ 0 & 0 & 0 & 0 \\ 0 & -1 & 0 & 1 \\ 0 & 0 & -1 & 1 \\ 1 & 0 & 0 & -1 \end{bmatrix} + \begin{bmatrix} -1 & 1 & 0 & 0 \\ 0 & 0 & 0 & 0 \\ 0 & -1 & 0 & 1 \\ 0 & 0 & -1 & 1 \\ 1 & 0 & 0 & -1 \end{bmatrix}\right) =$$

$$\left(\frac{1}{2}\right) * \left(\begin{bmatrix} -1 & 1 & 0 & 0 \\ 0 & 0 & 0 & 0 \\ 0 & -1 & 0 & 1 \\ 0 & 0 & -1 & 1 \\ 1 & 0 & 0 & -1 \end{bmatrix} + \begin{bmatrix} 1 & 1 & 0 & 0 \\ 0 & 0 & 0 & 0 \\ 0 & 1 & 0 & 1 \\ 0 & 0 & 1 & 1 \\ 1 & 0 & 0 & 1 \end{bmatrix}\right) = \begin{bmatrix} 0 & 1 & 0 & 0 \\ 0 & 0 & 0 & 0 \\ 0 & 0 & 0 & 1 \\ 0 & 0 & 0 & 1 \\ 1 & 0 & 0 & 0 \end{bmatrix}$$

$$A_{out} = A_{in} - A_E = \begin{bmatrix} 0 & 1 & 0 & 0 \\ 0 & 0 & 0 & 0 \\ 0 & 0 & 0 & 1 \\ 0 & 0 & 0 & 1 \\ 1 & 0 & 0 & 0 \end{bmatrix} - \begin{bmatrix} -1 & 1 & 0 & 0 \\ 0 & 0 & 0 & 0 \\ 0 & -1 & 0 & 1 \\ 0 & 0 & -1 & 1 \\ 1 & 0 & 0 & -1 \end{bmatrix} = \begin{bmatrix} -1 & 0 & 0 & 0 \\ 0 & 0 & 0 & 0 \\ 0 & -1 & 0 & 0 \\ 0 & 0 & -1 & 0 \\ 0 & 0 & 0 & -1 \end{bmatrix}$$

$$\therefore A_{in} = \begin{bmatrix} 0 & 1 & 0 & 0 \\ 0 & 0 & 0 & 0 \\ 0 & 0 & 0 & 1 \\ 0 & 0 & 0 & 1 \\ 1 & 0 & 0 & 0 \end{bmatrix}, A_{out} = \begin{bmatrix} -1 & 0 & 0 & 0 \\ 0 & 0 & 0 & 0 \\ 0 & -1 & 0 & 0 \\ 0 & 0 & -1 & 0 \\ 0 & 0 & 0 & -1 \end{bmatrix}$$

$$A_{in}^T = \begin{bmatrix} 0 & 0 & 0 & 0 & 1 \\ 1 & 0 & 0 & 0 & 0 \\ 0 & 0 & 0 & 0 & 0 \\ 0 & 0 & 1 & 1 & 0 \end{bmatrix}, A_{out}^T = \begin{bmatrix} -1 & 0 & 0 & 0 & 0 \\ 0 & 0 & -1 & 0 & 0 \\ 0 & 0 & 0 & -1 & 0 \\ 0 & 0 & 0 & 0 & -1 \end{bmatrix}$$

$D_{in} =$ $$\text{diag}(L_{in}) = \text{diag}(A_{in}^T * A_E) = \text{diag}\left(\begin{bmatrix} 0 & 0 & 0 & 0 & 1 \\ 1 & 0 & 0 & 0 & 0 \\ 0 & 0 & 0 & 0 & 0 \\ 0 & 0 & 1 & 1 & 0 \end{bmatrix} * \begin{bmatrix} -1 & 1 & 0 & 0 \\ 0 & 0 & 0 & 0 \\ 0 & -1 & 0 & 1 \\ 0 & 0 & -1 & 1 \\ 1 & 0 & 0 & -1 \end{bmatrix}\right) =$$

$$\text{diag}\left(\begin{bmatrix} 1 & 0 & 0 & -1 \\ -1 & 1 & 0 & 0 \\ 0 & 0 & 0 & 0 \\ 0 & -1 & -1 & 2 \end{bmatrix}\right) = \begin{bmatrix} 1 & 0 & 0 & 0 \\ 0 & 1 & 0 & 0 \\ 0 & 0 & 0 & 0 \\ 0 & 0 & 0 & 2 \end{bmatrix}$$

$D_{out} = \text{diag}(L_{out}) =$ $$\text{diag}(A_{out}^T * A_E) = \text{diag}\left(\begin{bmatrix} -1 & 0 & 0 & 0 & 0 \\ 0 & 0 & -1 & 0 & 0 \\ 0 & 0 & 0 & -1 & 0 \\ 0 & 0 & 0 & 0 & -1 \end{bmatrix} * \begin{bmatrix} -1 & 1 & 0 & 0 \\ 0 & 0 & 0 & 0 \\ 0 & -1 & 0 & 1 \\ 0 & 0 & -1 & 1 \\ 1 & 0 & 0 & -1 \end{bmatrix}\right) =$$

$$\text{diag}\left(\begin{bmatrix} 2 & -1 & 0 & 0 \\ 0 & 1 & 0 & -1 \\ 0 & 0 & 1 & -1 \\ -1 & 0 & 0 & 1 \end{bmatrix}\right) = \begin{bmatrix} 2 & 0 & 0 & 0 \\ 0 & 1 & 0 & 0 \\ 0 & 0 & 1 & 0 \\ 0 & 0 & 0 & 1 \end{bmatrix}$$

$$\therefore D_{in} = \begin{bmatrix} 1 & 0 & 0 & 0 \\ 0 & 1 & 0 & 0 \\ 0 & 0 & 0 & 0 \\ 0 & 0 & 0 & 2 \end{bmatrix}, D_{out} = \begin{bmatrix} 2 & 0 & 0 & 0 \\ 0 & 1 & 0 & 0 \\ 0 & 0 & 1 & 0 \\ 0 & 0 & 0 & 1 \end{bmatrix}$$

An important feature is the element in the third column in the third row of $D_{in}$, which has a value of "0" and the element in the third column in the third row of $D_{out}$, which has a value of "1." This indicates that node 3 has a no upstream edges, but has 1 edge downstream. In other words, node 3 has no device supplying to node 3, but has a device being supplied by node 3. As such, it can be determined that node 3 has no input and is therefore an open circuit.

Optimizer 450 can now adjust the edge availability matrix by making tower 1110 unavailable. This is shown in FIG. 11C in particular. In some embodiments, optimizer 450 determines the actual devices that can be removed (e.g., tower 1110 in the example above) by analyzing the incidence matrix to see which devices were being supplied by node 3. In the example, only tower 1110 is being supplied by node 3, and thus the incidence matrix can be updated to the following:

$$\begin{bmatrix} 1 \\ 0 \\ 1 \\ 0 \\ 1 \end{bmatrix}$$

The process could then repeat itself any time optimizer 450 is triggered (e.g., automatically, via a user control, via user instruction, etc.) and/or until all of the edges that are connected to open circuit nodes have been removed or indicated to be unavailable.

Complex Control System using Graph Theory

Figure 12:
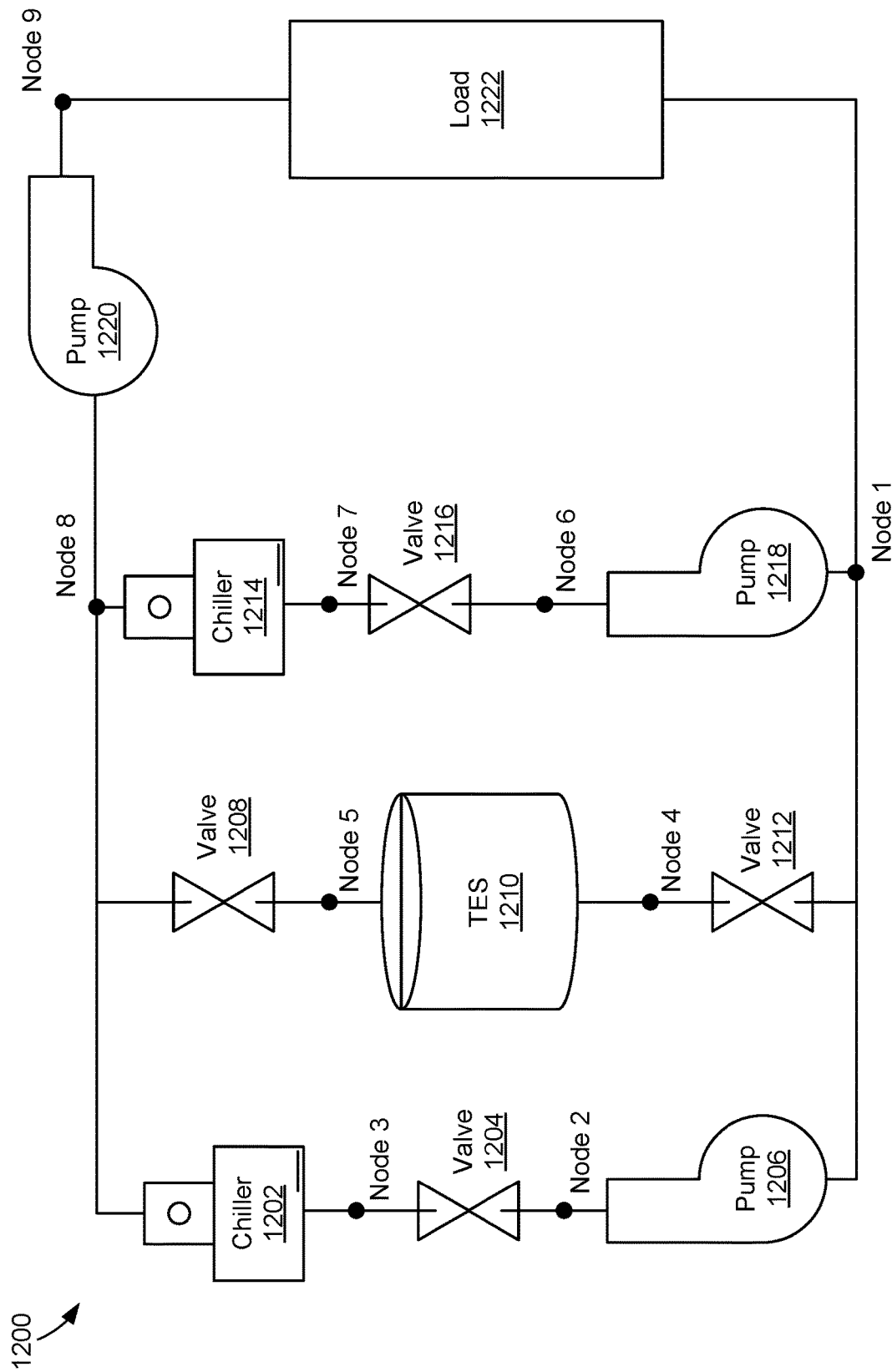
FIG. 12 is a schematic representation of an chiller system which can be part of the HVAC system of FIG. 1, according to some embodiments.

While the number of edges and/or nodes can increase significantly for a system (e.g., as shown in system 1200 when compared to system 1100), the graph theories and processes for reducing subsets of the equipment follow similar methods, in some embodiments. Referring now to FIG. 12, another example schematic representation of a chiller system 1200 is shown, according to some embodiments. Chiller system 1200 is shown to include chiller 1202, valve 1204, pump 1206, valve 1208, thermal energy storage 1210, valve 1212, chiller 1214, valve 1216, pump 1218, pump 1220, and load 1222. Chiller system 1200 may be a more complex system than chiller system 1100, but can still be modeled using the matrix processes outlined above. Again, these systems (e.g., systems 1100, 1200) are not limited to chiller systems and can include any number of devices that can be modeled in similar fashion. For example system 1200 could be a boiler system that includes boilers, boiler pumps, and heat exchangers. In another example, system 1200 could be an air handling system that includes blower fans, VAV boxes, and dampers. In some embodiments, system 1200 can include devices from multiple different subsystems, such as boilers, chillers, pumps, and fan coil units.

System 1200 is shown to include 11 devices and 9 nodes, which would result in the following A matrix:

$$A = \begin{bmatrix} -1 & 1 & 0 & 0 & 0 & 0 & 0 & 0 & 0 \\ 0 & -1 & 1 & 0 & 0 & 0 & 0 & 0 & 0 \\ 0 & 0 & -1 & 0 & 0 & 0 & 1 & 0 & 0 \\ -1 & 0 & 0 & 0 & 0 & 1 & 0 & 0 & 0 \\ 0 & 0 & 0 & 0 & 0 & -1 & 1 & 0 & 0 \\ 0 & 0 & 0 & 0 & 0 & 0 & -1 & 1 & 0 \\ -1 & 0 & 0 & 1 & 0 & 0 & 0 & 0 & 0 \\ 0 & 0 & 0 & -1 & 1 & 0 & 0 & 0 & 0 \\ 0 & 0 & 0 & 0 & -1 & 0 & 0 & 1 & 0 \\ 0 & 0 & 0 & 0 & 0 & 0 & 0 & -1 & 1 \\ 1 & 0 & 0 & 0 & 0 & 0 & 0 & 0 & -1 \end{bmatrix} \quad \text{Eq. (15)}$$

In some embodiments, the columns of Eq. 15 can represent the nodes in system 1200 while the rows of Eq. 15 can represent the devices in system 1200. The specific values in the matrix elements (e.g., "−1" in the top-left element, etc.) can represent nodal connections in a similar fashion to incidence matrices described above. For example, a "1" can be used to indicate flow into a node, a "−1" can be used to indicate flow out of a node, and a "0" can be used to indicate that the equipment is not relating to the node. Furthermore, Eq. 15 (i.e., the incidence matrix for system 1200) can be analyzed using similar methods and/or calculations as those described above with reference to FIG. 11A, system 1100, and incidence matrix A shown in Eq. 5. For example, the L matrix for system 1200 could be calculated using Eq. 6 described above:

$$L = A^T A = \begin{bmatrix} -1 & 0 & 0 & -1 & 0 & 0 & -1 & 0 & 0 & 0 & 1 \\ 1 & -1 & 0 & 0 & 0 & 0 & 0 & 0 & 0 & 0 & 0 \\ 0 & 1 & -1 & 0 & 0 & 0 & 0 & 0 & 0 & 0 & 0 \\ 0 & 0 & 0 & 0 & 0 & 0 & 1 & -1 & 0 & 0 & 0 \\ 0 & 0 & 0 & 0 & 0 & 0 & 0 & 1 & -1 & 0 & 0 \\ 0 & 0 & 0 & 1 & -1 & 0 & 0 & 0 & 0 & 0 & 0 \\ 0 & 0 & 0 & 0 & 1 & -1 & 0 & 0 & 0 & 0 & 0 \\ 0 & 0 & 1 & 0 & 0 & 1 & 0 & 0 & 1 & -1 & 0 \\ 0 & 0 & 0 & 0 & 0 & 0 & 0 & 0 & 0 & 1 & -1 \end{bmatrix} *$$

-continued $$\begin{bmatrix} -1 & 1 & 0 & 0 & 0 & 0 & 0 & 0 & 0 \\ 0 & -1 & 1 & 0 & 0 & 0 & 0 & 0 & 0 \\ 0 & 0 & -1 & 0 & 0 & 0 & 0 & 1 & 0 \\ -1 & 0 & 0 & 0 & 0 & 1 & 0 & 0 & 0 \\ 0 & 0 & 0 & 0 & 0 & -1 & 1 & 0 & 0 \\ 0 & 0 & 0 & 0 & 0 & 0 & -1 & 1 & 0 \\ -1 & 0 & 0 & 1 & 0 & 0 & 0 & 0 & 0 \\ 0 & 0 & 0 & -1 & 1 & 0 & 0 & 0 & 0 \\ 0 & 0 & 0 & 0 & -1 & 0 & 0 & 1 & 0 \\ 0 & 0 & 0 & 0 & 0 & 0 & 0 & -1 & 1 \\ 1 & 0 & 0 & 0 & 0 & 0 & 0 & 0 & -1 \end{bmatrix} =$$

$$\begin{bmatrix} 4 & -1 & 0 & -1 & 0 & -1 & 0 & 0 & -1 \\ -1 & 2 & -1 & 0 & 0 & 0 & 0 & 0 & 0 \\ 0 & -1 & 2 & 0 & 0 & 0 & 0 & -1 & 0 \\ -1 & 0 & 0 & 2 & -1 & 0 & 0 & 0 & 0 \\ 0 & 0 & 0 & -1 & 2 & 0 & 0 & -1 & 0 \\ -1 & 0 & 0 & 0 & 0 & 2 & -1 & 0 & 0 \\ 0 & 0 & 0 & 0 & 0 & -1 & 2 & -1 & 0 \\ 0 & 0 & -1 & 0 & -1 & 0 & -1 & 4 & -1 \\ -1 & 0 & 0 & 0 & 0 & 0 & 0 & -1 & 2 \end{bmatrix}$$

While the D matrix can be calculated using Eq. 7 described above:

$$D = \mathrm{diag}(L) = \mathrm{diag} \begin{bmatrix} 4 & -1 & 0 & -1 & 0 & -1 & 0 & 0 & -1 \\ -1 & 2 & -1 & 0 & 0 & 0 & 0 & 0 & 0 \\ 0 & -1 & 2 & 0 & 0 & 0 & 0 & -1 & 0 \\ -1 & 0 & 0 & 2 & -1 & 0 & 0 & 0 & 0 \\ 0 & 0 & 0 & -1 & 2 & 0 & 0 & -1 & 0 \\ -1 & 0 & 0 & 0 & 0 & 2 & -1 & 0 & 0 \\ 0 & 0 & 0 & 0 & 0 & -1 & 2 & -1 & 0 \\ 0 & 0 & -1 & 0 & -1 & 0 & -1 & 4 & -1 \\ -1 & 0 & 0 & 0 & 0 & 0 & 0 & -1 & 2 \end{bmatrix} =$$

$$\begin{bmatrix} 4 & 0 & 0 & 0 & 0 & 0 & 0 & 0 & 0 \\ 0 & 2 & 0 & 0 & 0 & 0 & 0 & 0 & 0 \\ 0 & 0 & 2 & 0 & 0 & 0 & 0 & 0 & 0 \\ 0 & 0 & 0 & 2 & 0 & 0 & 0 & 0 & 0 \\ 0 & 0 & 0 & 0 & 2 & 0 & 0 & 0 & 0 \\ 0 & 0 & 0 & 0 & 0 & 2 & 0 & 0 & 0 \\ 0 & 0 & 0 & 0 & 0 & 0 & 2 & 0 & 0 \\ 0 & 0 & 0 & 0 & 0 & 0 & 0 & 4 & 0 \\ 0 & 0 & 0 & 0 & 0 & 0 & 0 & 0 & 2 \end{bmatrix}$$

And the W matrix can be calculated using Eq. 8 described above:

$$W = \mathrm{triangular}(L) = \mathrm{triangular} \left( \begin{bmatrix} 4 & -1 & 0 & -1 & 0 & -1 & 0 & 0 & -1 \\ -1 & 2 & -1 & 0 & 0 & 0 & 0 & 0 & 0 \\ 0 & -1 & 2 & 0 & 0 & 0 & 0 & -1 & 0 \\ -1 & 0 & 0 & 2 & -1 & 0 & 0 & 0 & 0 \\ 0 & 0 & 0 & -1 & 2 & 0 & 0 & -1 & 0 \\ -1 & 0 & 0 & 0 & 0 & 2 & -1 & 0 & 0 \\ 0 & 0 & 0 & 0 & 0 & -1 & 2 & -1 & 0 \\ 0 & 0 & -1 & 0 & -1 & 0 & -1 & 4 & -1 \\ -1 & 0 & 0 & 0 & 0 & 0 & 0 & -1 & 2 \end{bmatrix} \right) =$$

$$\begin{bmatrix} 0 & -1 & 0 & -1 & 0 & -1 & 0 & 0 & -1 \\ -1 & 0 & -1 & 0 & 0 & 0 & 0 & 0 & 0 \\ 0 & -1 & 0 & 0 & 0 & 0 & 0 & -1 & 0 \\ -1 & 0 & 0 & 0 & -1 & 0 & 0 & 0 & 0 \\ 0 & 0 & 0 & -1 & 0 & 0 & 0 & -1 & 0 \\ -1 & 0 & 0 & 0 & 0 & 0 & -1 & 0 & 0 \\ 0 & 0 & 0 & 0 & 0 & -1 & 0 & -1 & 0 \\ 0 & 0 & -1 & 0 & -1 & 0 & -1 & 0 & -1 \\ -1 & 0 & 0 & 0 & 0 & 0 & 0 & -1 & 0 \end{bmatrix}$$

$$\therefore L = \begin{bmatrix} 4 & -1 & 0 & -1 & 0 & -1 & 0 & 0 & -1 \\ -1 & 2 & -1 & 0 & 0 & 0 & 0 & 0 & 0 \\ 0 & -1 & 2 & 0 & 0 & 0 & 0 & -1 & 0 \\ -1 & 0 & 0 & 2 & -1 & 0 & 0 & 0 & 0 \\ 0 & 0 & 0 & -1 & 2 & 0 & 0 & -1 & 0 \\ -1 & 0 & 0 & 0 & 0 & 2 & -1 & 0 & 0 \\ 0 & 0 & 0 & 0 & 0 & -1 & 2 & -1 & 0 \\ 0 & 0 & -1 & 0 & -1 & 0 & -1 & 4 & -1 \\ -1 & 0 & 0 & 0 & 0 & 0 & 0 & -1 & 2 \end{bmatrix},$$

$$D = \begin{bmatrix} 4 & 0 & 0 & 0 & 0 & 0 & 0 & 0 & 0 \\ 0 & 2 & 0 & 0 & 0 & 0 & 0 & 0 & 0 \\ 0 & 0 & 2 & 0 & 0 & 0 & 0 & 0 & 0 \\ 0 & 0 & 0 & 2 & 0 & 0 & 0 & 0 & 0 \\ 0 & 0 & 0 & 0 & 2 & 0 & 0 & 0 & 0 \\ 0 & 0 & 0 & 0 & 0 & 2 & 0 & 0 & 0 \\ 0 & 0 & 0 & 0 & 0 & 0 & 2 & 0 & 0 \\ 0 & 0 & 0 & 0 & 0 & 0 & 0 & 4 & 0 \\ 0 & 0 & 0 & 0 & 0 & 0 & 0 & 0 & 2 \end{bmatrix},$$

$$W = \begin{bmatrix} 0 & -1 & 0 & -1 & 0 & -1 & 0 & 0 & -1 \\ -1 & 0 & -1 & 0 & 0 & 0 & 0 & 0 & 0 \\ 0 & -1 & 0 & 0 & 0 & 0 & 0 & -1 & 0 \\ -1 & 0 & 0 & 0 & -1 & 0 & 0 & 0 & 0 \\ 0 & 0 & 0 & -1 & 0 & 0 & 0 & -1 & 0 \\ -1 & 0 & 0 & 0 & 0 & 0 & -1 & 0 & 0 \\ 0 & 0 & 0 & 0 & 0 & -1 & 0 & -1 & 0 \\ 0 & 0 & -1 & 0 & -1 & 0 & -1 & 0 & -1 \\ -1 & 0 & 0 & 0 & 0 & 0 & 0 & -1 & 0 \end{bmatrix}$$

The D matrix above shows how many edges are connected to each node. For example, four devices are connected to node 1, two devices are connected to node 2, two devices are connected to node 3, and so on. Similarly, the W matrix above can indicate when nodes are connected by an edge. For example, the first column of W indicates that there are four devices connected to node 1, evident by the fact that there are four "−1" elements in column 1. While not currently shown, the process of breaking down the A matrix into $A_{in}$ and $A_{out}$, along with the respective $D_{in}$ or $D_{out}$ matrices can also be performed. In general, any system that includes devices capable of transporting or providing resources to one or more other devices such that the device relationships can be represented schematically may employ the methods and calculations described herein.

For example, the $D_{in}$ or $D_{out}$ for the A matrix of system 1200 can be determined and any open circuit nodes detected (e.g., based on any diagonal element having a "0" in the space, etc.), can be used determine whether there are any edges connected to the open circuit nodes. The edges of those open circuit nodes can then be removed and/or their availability is set to zero. For example, in system 1200, valve 1204 was determined to functioning improperly and optimizer 450 performs the methods and calculations described herein to determine that node 2 is an open circuit node. As such valve 1204 and chiller 1202 are removed and their availability is set to zero. In some embodiments (as mentioned above), these processes can be repeated iteratively (e.g., 3 iterations, 4 iterations, etc.) until all of the devices of the open circuit nodes are removed.

While systems 1100 and 1200 generally refer to determining downstream devices that are schematically dependent on open circuit nodes in series with an unavailable device, any type of series relationship, parallel relationship, or a combination thereof can be analyzed using the graph theory analyses described above to remove edge devices connected to open circuit nodes. For example, if three or more devices are downstream of an unavailable device and all three devise are sourced by the same node that is supplied by the unavailable device (e.g., the three devices are downstream from the unavailable device in a parallel relationship), all three devices can be identified as also being unavailable. Of course, any schematic relationships between devices that relate one or more open circuit nodes to unavailable edge devices connected to those one or more open circuit nodes can be analyzed using the graph theory analyses described above, and are not limited to the embodiments shown in systems 1100, 1150, 1160, and/or 1200.

Control System Processes

Figure 13:
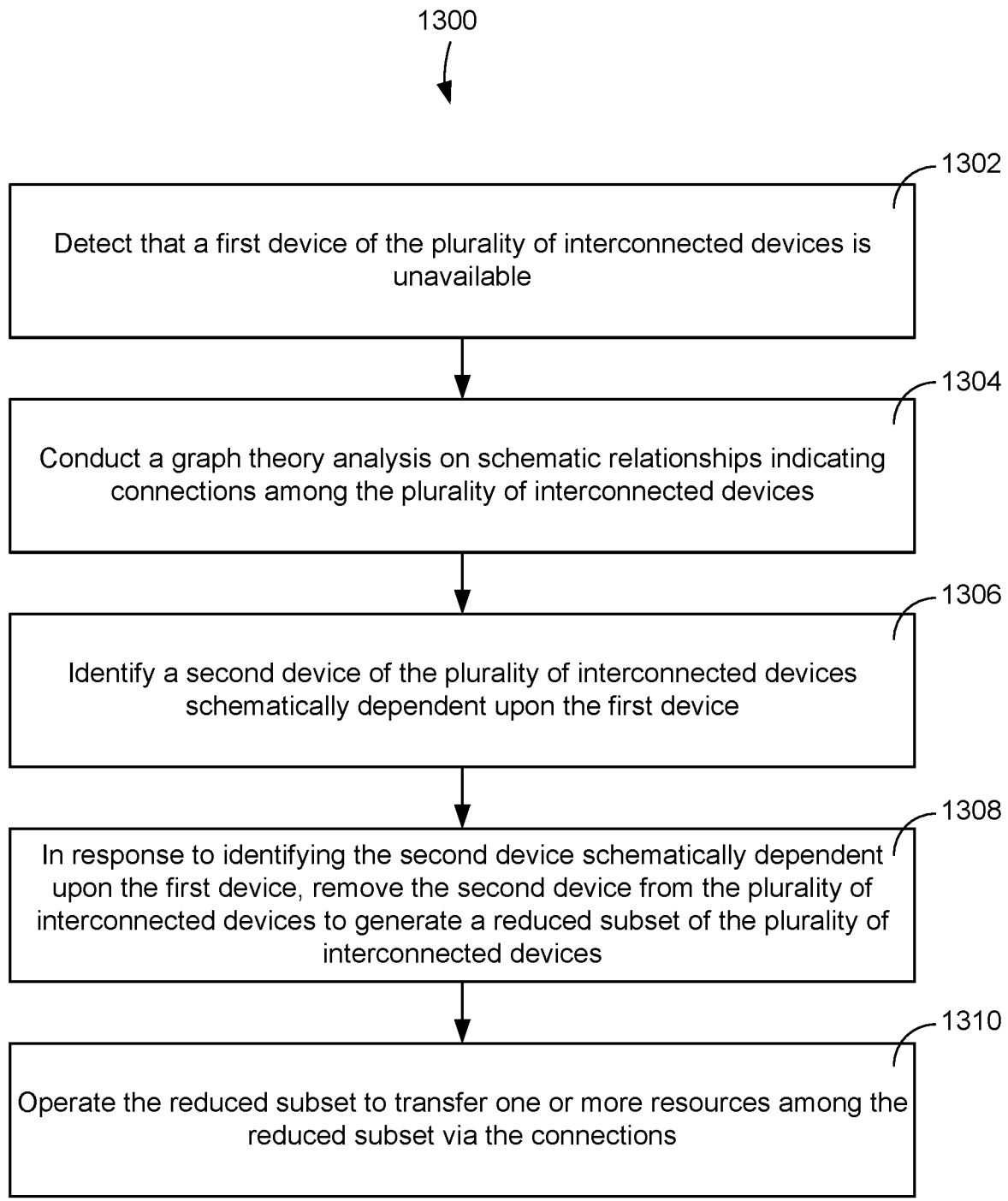
FIG. 13 is a flow diagram of a process for identifying devices connected to open circuit nodes which can be performed by the controller of FIG. 4, according to some embodiments.

Referring now to FIG. 13, a flow diagram of a process for reducing the subset of devices (e.g., HVAC devices, chiller devices, boiler devices, air flow devices, etc.) and updating the schematic representation is shown, according to some embodiments. Process 1300 can be performed by any of the processing circuitry described above. For example, process 1300 can be performed at least in part by optimizer 450.

Process 1300 is shown to include detecting that a first device of the plurality of interconnected devices is unavailable (step 1302). In some embodiments, optimizer 450 or other processing circuitry described herein can determine that one or more devices in system 1100 is unavailable. This may be due to detecting that the operation of the device is outside of an acceptable threshold, failure of the device, unreliability of the device, or any combination thereof. As described above with reference to FIG. 11, devices may refer to any piece of equipment that can receive resources (e.g., electricity, fluid, water, air, oil, heat, etc.) or provide resources, and the relationships of the one or more devices in system 1100 can be mapped schematically, as shown in FIGS. 11A-C. While system 1100 is shown as a chiller system in particular, any type of building system or otherwise resource-based system and the devices thereof can be implemented instead of a chiller system, such as an electrical system, a boiler system, or an air duct system. In some embodiments, devices of several different systems can be combined to form a multi sub-system design, which can similarly be schematically represented.

In some embodiments, the detection of a device that is inoperable is determined by monitoring the device using one or more sensors. For example, a pump may be monitored by a voltage sensor, flow rate sensor, and pressure sensor. A deviation from an expected value or range of values for any one of these sensors could indicate that the pump is not operating properly. A decision may be made (e.g., automatically, by user instruction), based on this operation error to make the device "unavailable," such that resources will no longer be provided by and/or provided to the device.

Process 1300 is shown to include conducting a graph theory analysis on schematic relationships indicating connections among the plurality of interconnected devices (step 1304). Once the device(s) has been determined to be unavailable, optimizer 450 may proceed with conducting a graph theory analysis of the schematic relationships of the system. This may be done to ensure that any other devices that are directly or indirectly sourced (e.g., resources are provided to them from the unavailable device) are removed from the system schematics, as they are now unavailable due to their relationship with the unavailable device.

The graph theory analysis can include any of the matrix algebra, graph theory, transpose algebra, element-wise algebra, and/or other calculations described herein. In some embodiments, the graph theory analysis may include at least some of the following: (i) in response to determining a device is unavailable, updating a matrix of available devices (e.g., $A_E$), (ii) using that matrix of available devices to update an incidence matrix (e.g., A) of the system, (iii), using the incidence matrix to determine the upstream edges sourcing each node (e.g., $A_{in}$) and the downstream edges sinking each node (e.g., $A_{out}$), (iv) determining the number of upstream edges connected to each node (e.g., $D_{in}$) and downstream edges sinking each node (e.g., $D_{in}$), (v) determine if there are any nodes without inputs (e.g., $D_{in,(i\ldots j)}<1$) and/or any nodes without outputs (e.g., $D_{out,(i\ldots j)}<1$), (vi) remove the devices that are downstream of the nodes without inputs/outputs, and (vii) update the schematic representation of the system accordingly. This process is described in greater detail with reference to FIG. 14.

Process 1300 is shown to include identifying a second device of the plurality of interconnected devices schematically dependent upon the first device (step 1306). In the event that it is determined that there is a node without an output or a node without an output, it can be determined which devices are schematically dependent (e.g., downstream, etc.) of the first device using the updated incidence matrix $A_E$. For example, optimizer 450 determines the actual devices that can be removed by analyzing the incidence matrix to see which devices were being supplied by node 3. In the updated incidence matrix $A_E$ shown above for system 1100, only tower 1110 is being supplied by node 3.

Process 1300 is shown to include, in response to identifying the second device schematically dependent upon the first device, removing the second device from the plurality of interconnected devices to generate a reduced subset of the plurality of interconnected devices (step 1308). Once the device or devices have been identified any are ready to be removed, optimizer 450 may update the updated incidence matrix $A_E$ again to change the matrix element associated with the identified device(s) to "0." The graph theory analysis can then repeat, by using that matrix of available devices to update an incidence matrix, then using the incidence matrix to determine the upstream edges sourcing each node and the downstream edges sinking each node, and so on.

Process 1300 is shown to include operating the reduced subset to transfer one or more resources among the reduced subset via the connections (step 1310). Once the reduced subset is determined, an optimization process or other control process can be executed to generate appropriate operating setpoints for the reduced subset. The devices in the reduced subset can then operate using those setpoints. For example, following the example graph theory analysis presented for system 1100, pump 1108 and—via the graph theory analysis—tower 1110 are removed from the schematic representations. Optimizer 450 then needs to increase the pump pressure to pump 1104 to satisfy the present load demands (not shown) of the system. The pressure setpoint can be updated via optimizer 450 and control signals are provided to pump 1104 accordingly.

Figure 14:
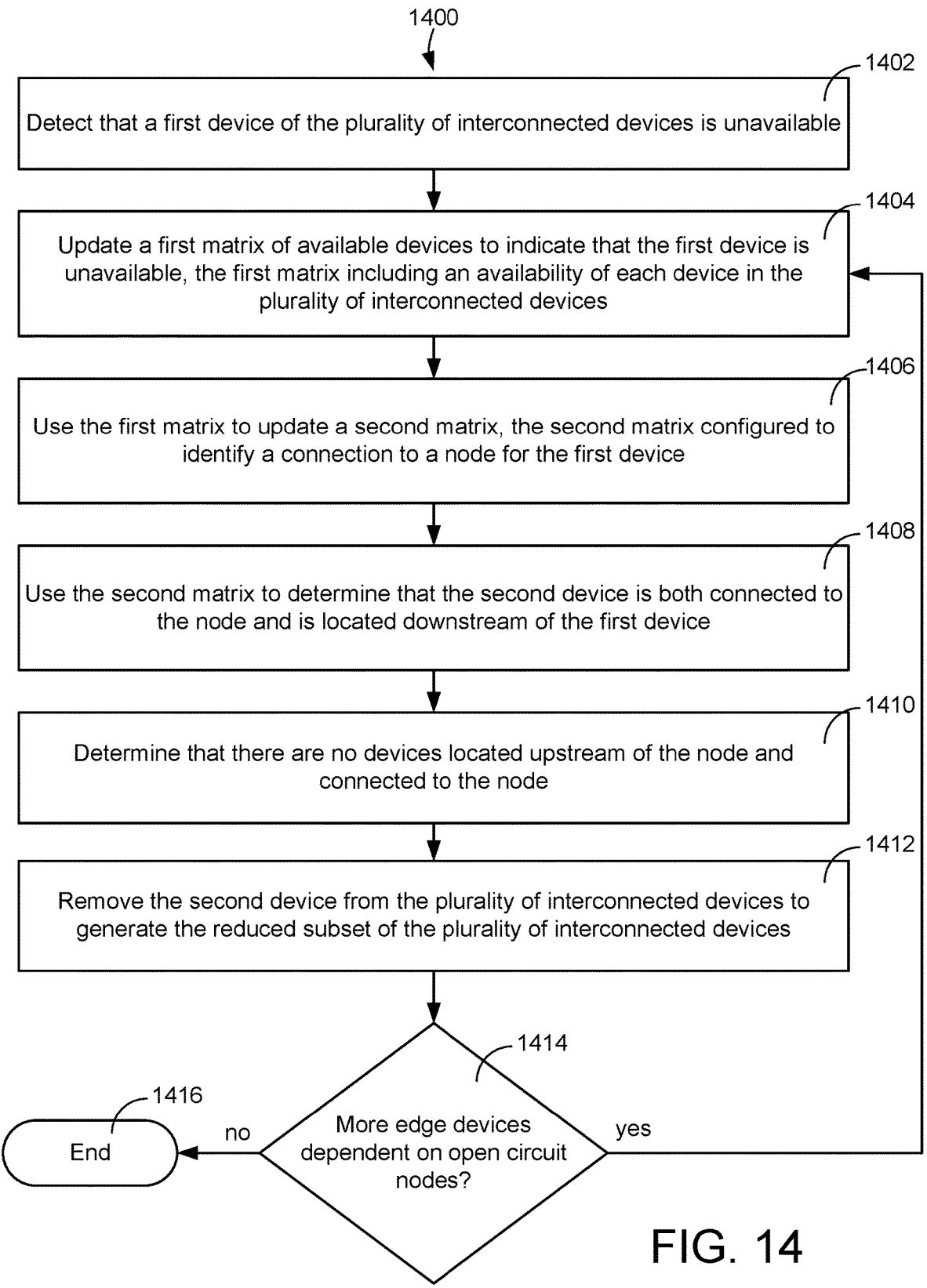
FIG. 14 is a flow diagram of a process for identifying devices connected to open circuit nodes which can be performed by the controller of FIG. 4, according to some embodiments.

Referring now to FIG. 14, another flow diagram of a process for reducing the subset of devices (e.g., HVAC devices, chiller devices, boiler devices, air flow devices, etc.) and updating the schematic representation is shown, according to some embodiments. Process 1400 can be performed by any of the processing circuitry described above. For example, process 1400 can be performed at least in part by optimizer 450.

Process 1400 is shown to include detecting that a first device of the plurality of interconnected devices is unavailable (step 1402). In some embodiments, the first device can be the device that is initially detected to be unavailable and thereby starting the process of reducing the schematic representation. In the example with reference to system 1100, pump 1108 may be the first device, while tower 1110 acts as the second device (discussed in more detail below).

Process 1400 is shown to include updating a first matrix of available devices to indicate that the first device is unavailable, the first matrix including an availability of each device in the plurality of interconnected devices (step 1404). In some embodiments, updating the first matrix refers to updating an established edge availability matrix. For example, in system 1100, up determining that pump 1108 is unavailable, optimizer 450 updates the edge availability matrix $A_E$ so that the element in availability matrix $A_E$ that represents pump 1108 is a "0."

Process 1400 is shown to include using the first matrix to update a second matrix, the second matrix configured to identify a connection to a node for the first device (step 1406). Once edge availability matrix $A_E$, it can be used to update the incidence matrix A. In some embodiments, this is performed by performing an element-wise multiplication of edge availability matrix $A_E$ and incidence matrix A. This can refer to multiplying each element in one matrix with the row of the entire other matrix. In the above example, as edge availability matrix $A_E$ is an M×1 matrix with M representing the devices in the system, the single element of the first row of edge availability matrix $A_E$ is multiplied by the entire first row of incidence matrix A, such that each element in the first row of incidence matrix A is multiplied by either "1" or "0," depending on the value in the corresponding element in edge availability matrix $A_E$. This can remove any nodal connection representations for a device in of incidence matrix A in response to the device being identified unavailable.

Process 1400 is shown to include using the second matrix to determine that the second device is both connected to the node and is located downstream of the first device (step 1408). In some embodiments, step 1408 refers to using graph theory analysis to determine the upstream edges sourcing each node (e.g., $A_{in}$) and the downstream edges sinking each node (e.g., $A_{out}$). Step 1408 may also refer to determining the number of upstream edges connected to each node (e.g., $D_{in}$) and downstream edges sinking each node (e.g., $D_{in}$). These calculations are described in detail above with reference to FIGS. 11A-C.

Process 1400 is shown to include determining that there are no devices located upstream of the node and connected to the node (step 1410). In some embodiments, step 1410 refers to the comparison between nodes without inputs and the nodes without outputs. In the event that a single node has no inputs and no outputs (not shown), this is not indicative that there are edge devices connected to the open circuit node. However, in the event that a single node has X number of inputs and 0 outputs, or vice versa, this can be indicative of an open circuit node.

Process 1400 is shown to include removing the second device from the plurality of interconnected devices to generate the reduced subset of the plurality of interconnected devices (step 1412). Optimizer 450 may be configured to analyze nodes with 0 inputs/outputs and remove each edge device that is connected to the open circuit node. This may be performed by setting the respective element in the edge availability matrix $A_E$ to zero, thereby updating the incidence matrix A the next time this process is repeated.

Process 1400 is shown to include determining if there are more edge devices dependent on open circuit nodes (step 1414). The process (i.e., the graph theory analysis, etc.) may be repeated any number of times until the edge count during step 1408 is no longer decreasing. As such, the edge availability matrix $A_E$ and the incidence matrix A may be updated several times (e.g., 3 times, 10 times, etc.) until there are no more edge devices connected to any open circuit nodes.

Configuration of Exemplary Embodiments

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

The term "or," as used herein, is used in its inclusive sense (and not in its exclusive sense) so that when used to connect a list of elements, the term "or" means one, some, or all of the elements in the list. Conjunctive language such as the phrase "at least one of X, Y, and Z," unless specifically stated otherwise, is understood to convey that an element may be either X, Y, Z; X and Y; X and Z; Y and Z; or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

The hardware and data processing components used to implement the various processes, operations, illustrative logics, logical blocks, modules and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device) may include one or more devices (e.g., RAM, ROM, Flash memory, hard disk storage) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit or the processor) the one or more processes described herein.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It is important to note that the construction and arrangement of various systems (e.g., system 100, system 200, etc.) and methods as shown in the various exemplary embodiments is illustrative only. Additionally, any element disclosed in one embodiment may be incorporated or utilized with any other embodiment disclosed herein. Although only one example of an element from one embodiment that can be incorporated or utilized in another embodiment has been described above, it should be appreciated that other elements of the various embodiments may be incorporated or utilized with any of the other embodiments disclosed herein.

What is claimed is:

1. A controller for a plurality of interconnected devices in a system, the controller comprising a processing circuit configured to:
   detect that a first device of the plurality of interconnected devices is unavailable using stored availability information that indicates which devices of the plurality of interconnected devices are available and which devices of the plurality of interconnected devices are unavailable;
   identify a second device of the plurality of interconnected devices schematically dependent upon the first device by conducting a graph theory analysis on schematic relationships indicating connections among the plurality of interconnected devices;
   in response to identifying the second device schematically dependent upon the first device, generate a reduced subset of the plurality of interconnected devices that excludes the second device; and
   operate the reduced subset to transfer one or more resources among the reduced subset via the connections, wherein operating the reduced subset to transfer the one or more resources among the reduced subset via the connections comprises operating the reduced subset to transfer at least one of:
   a first fluid, wherein the system is a chiller system, and the first device is at least one of a pump, valve, storage unit, or a chiller;
   a second fluid, wherein the system is an air flow system, and the first device is at least one of a variable air volume (VAV) box, a damper, an actuator, or a fan; and
   a flow of electricity, wherein the system is an electrical system, and the first device is at least one of a motor, a generator, or an electrical HVAC device.

2. The controller of claim 1, wherein conducting the graph theory analysis on the schematic relationships comprises:
   in response to detecting that the first device is unavailable, updating a first matrix of available devices to indicate that the first device is unavailable, wherein the first matrix comprises an availability of each device in the plurality of interconnected devices; and using the first matrix to update a second matrix, wherein the second matrix identifies a connection to a node for the first device.

3. The controller of claim 2, wherein conducting the graph theory analysis on the schematic relationships further comprises:

using the second matrix to determine that the second device is connected to the node and is located downstream of the first device;

determining that there are no devices located upstream of the node and connected to the node; and in response to determining that there are no devices located upstream of the node and connected to the node, removing the second device from the plurality of interconnected devices to generate the reduced subset of the plurality of interconnected devices.

4. The controller of claim 3, wherein removing the second device from the plurality of interconnected devices comprises:

updating the first matrix to identify that the second device is unavailable; and updating the second matrix using the first matrix to remove the second device from the plurality of interconnected devices.

5. The controller of claim 1, wherein the controller is further configured to, in response to removing the second device from the plurality of interconnected devices to generate the reduced subset, conduct the graph theory analysis repeatedly until there are no more devices of the plurality of interconnected devices that are schematically dependent on any device of the plurality of interconnected devices that is unavailable.

6. The controller of claim 1, wherein conducting the graph theory analysis on the schematic relationships comprises:

using a plurality of matrices to identify the second device of the plurality of interconnected devices schematically dependent upon the first device, wherein:

each set of elements of a matrix of the plurality of matrices in a first direction is associated with a corresponding device of the plurality of interconnected devices; and each set of elements of the matrix of the plurality of matrices in a second direction is associated with a corresponding node.

7. The controller of claim 1, wherein the processing circuit is further configured to generate the schematic relationships indicating the connections among the plurality of interconnected devices using a combination of devices from a plurality of different subsystems, the plurality of different subsystems comprising the chiller system, the air flow system, and the electrical system.

8. A method for controlling a plurality of interconnected devices in a system, the method comprising:

detecting that a first device of the plurality of interconnected devices is unavailable using stored availability information that indicates which devices of the plurality of interconnected devices are available and which devices of the plurality of interconnected devices are unavailable;

identifying a second device of the plurality of interconnected devices schematically dependent upon the first device by conducting a graph theory analysis on schematic relationships indicating connections among the plurality of interconnected devices;

in response to identifying the second device schematically dependent upon the first device, generate a reduced subset of the plurality of interconnected devices that excludes the second device; and operating the reduced subset to transfer one or more resources among the reduced subset via the connections, wherein operating the reduced subset to transfer the one or more resources among the reduced subset via the connections comprises operating the reduced subset to transfer at least one of:

a first fluid, wherein the system is a chiller system, and the first device is at least one of a pump, valve, storage unit, or a chiller;

a second fluid, wherein the system is an air flow system, and the first device is at least one of a variable air volume (VAV) box, a damper, an actuator, or a fan; and a flow of electricity, wherein the system is an electrical system, and the first device is at least one of a motor, a generator, or an electric HVAC device.

9. The method of claim 8, wherein conducting the graph theory analysis on the schematic relationships comprises:

in response to detecting that the first device is unavailable, updating a first matrix of available devices to indicate that the first device is unavailable, wherein the first matrix comprises an availability of each device in the plurality of interconnected devices; and using the first matrix to update a second matrix, wherein the second matrix identifies a connection to a node for the first device.

10. The method of claim 9, wherein conducting the graph theory analysis on the schematic relationships further comprises:

using the second matrix to determine that the second device is connected to the node and is located downstream of the first device;

determining that there are no devices located upstream of the node and connected to the node; and in response to determining that there are no devices located upstream of the node and connected to the node, removing the second device from the plurality of interconnected devices to generate the reduced subset of the plurality of interconnected devices.

11. The method of claim 10, wherein removing the second device from the plurality of interconnected devices comprises:

updating the first matrix to identify that the second device is unavailable; and updating the second matrix using the first matrix to remove the second device from the plurality of interconnected devices.

12. The method of claim 8, wherein the method further comprises, in response to removing the second device from the plurality of interconnected devices to generate the reduced subset, conducting the graph theory analysis repeatedly until there are no more devices of the plurality of interconnected devices that are schematically dependent on any device of the plurality of interconnected devices that is unavailable.

13. The method of claim 8, wherein conducting the graph theory analysis on the schematic relationships comprises:

using a plurality of matrices to identify the second device of the plurality of interconnected devices schematically dependent upon the first device, wherein:

each set of elements of a matrix of the plurality of matrices in a first direction is associated with a corresponding device of the plurality of interconnected devices; and each set of elements of the matrix of the plurality of matrices in a second direction is associated with a corresponding node.

14. The method of claim 8, wherein the method further comprises generating the schematic relationships indicating the connections among the plurality of interconnected devices using a combination of devices from a plurality of different subsystems, the plurality of different subsystems comprising the chiller system, the air flow system, and the electrical system.

15. A control system for controlling a plurality of interconnected devices in a system, the control system comprising a controller comprising a processing circuit configured to:
    detect that a first device of the plurality of interconnected devices is unavailable using stored availability information that indicates which devices of the plurality of interconnected devices are available and which devices of the plurality of interconnected devices are unavailable;
    identify a second device of the plurality of interconnected devices schematically dependent upon the first device by conducting a graph theory analysis on schematic relationships indicating connections among the plurality of interconnected devices;
    in response to identifying the second device schematically dependent upon the first device, generate a reduced subset of the plurality of interconnected devices that excludes the second device;
    operate the reduced subset to transfer one or more resources among the reduced subset via the connections, wherein operating the reduced subset to transfer the one or more resources among the reduced subset via the connections comprises operating the reduced subset to transfer at least one of:
        a first fluid, wherein the system is a chiller system, and the first device is at least one of a pump, valve, storage unit, or a chiller;
        a second fluid, wherein the system is an air flow system, and the first device is at least one of a variable air volume (VAV) box, a damper, an actuator, or a fan; and
        a flow of electricity, wherein the system is an electrical system, and the first device is at least one of a motor, a generator, or an electric HVAC device; and
    in response to removing the second device from the plurality of interconnected devices to generate the reduced subset, conduct the graph theory analysis repeatedly until there are no more devices of the plurality of interconnected devices that are schematically dependent on any device of the plurality of interconnected devices that is unavailable.

16. The control system of claim 15, wherein conducting the graph theory analysis on the schematic relationships comprises:
    in response to detecting that the first device is unavailable, updating a first matrix of available devices to indicate that the first device is unavailable, wherein the first matrix comprises an availability of each device in the plurality of interconnected devices; and
    using the first matrix to update a second matrix, wherein the second matrix identifies a connection to a node for the first device.

17. The control system of claim 16, wherein conducting the graph theory analysis on the schematic relationships further comprises:
    using the second matrix to determine that the second device is connected to the node and is located downstream of the first device;
    determining that there are no devices located upstream of the node and connected to the node; and
    in response to determining that there are no devices located upstream of the node and connected to the node, removing the second device from the plurality of interconnected devices to generate the reduced subset of the plurality of interconnected devices.

18. The control system of claim 17, wherein removing the second device from the plurality of interconnected devices comprises:
    updating the first matrix to identify that the second device is unavailable; and
    updating the second matrix using the first matrix to remove the second device from the plurality of interconnected devices.

* * * * *